(12) United States Patent
Vandyke et al.

(10) Patent No.: US 11,739,973 B2
(45) Date of Patent: Aug. 29, 2023

(54) SOUND ABSORBING DUCT FOR ENVIRONMENTAL CONTROL SYSTEM

(71) Applicant: THE BOEING COMPANY, Chicago, IL (US)

(72) Inventors: Bryce A. Vandyke, Snohomish, WA (US); John Erik West, Seattle, WA (US); Douglas D. Maben, Snohomish, WA (US); Andrew K. Fung, Everett, WA (US); David R. C. Cannal, Marysville, WA (US)

(73) Assignee: THE BOEING COMPANY, Chicago, IL (US)

( * ) Notice: Subject to any disclaimer, the term of this patent is extended or adjusted under 35 U.S.C. 154(b) by 350 days.

(21) Appl. No.: 16/105,864

(22) Filed: Aug. 20, 2018

(65) Prior Publication Data
US 2020/0056803 A1 Feb. 20, 2020

(51) Int. Cl.
*F24F 13/02* (2006.01)
*F24F 13/24* (2006.01)
*B64D 13/06* (2006.01)

(52) U.S. Cl.
CPC .. *F24F 13/0263* (2013.01); *B64D 2013/0603* (2013.01); *F24F 13/0245* (2013.01); *F24F 13/0281* (2013.01); *F24F 2013/242* (2013.01)

(58) Field of Classification Search
CPC combination set(s) only.
See application file for complete search history.

(56) References Cited

U.S. PATENT DOCUMENTS

| | | | |
|---|---|---|---|
| 5,947,158 A * | 9/1999 | Gross | F24F 13/0218 138/158 |
| 7,842,147 B2 | 11/2010 | Shen et al. | |
| 8,371,338 B2 | 2/2013 | Princell et al. | |
| 8,393,436 B2 * | 3/2013 | Tomerlin | F01N 1/24 181/222 |
| 8,789,650 B2 | 7/2014 | West | |
| 8,899,377 B2 | 12/2014 | Thomas | |
| 9,567,087 B1 | 2/2017 | Monacchio et al. | |
| 9,896,216 B2 * | 2/2018 | Linert | B64D 13/06 |
| 2007/0074930 A1 | 4/2007 | Tomerlin et al. | |
| 2007/0131299 A1 | 6/2007 | Kornbleet | |
| 2009/0200103 A1 | 8/2009 | Potschka | |

(Continued)

FOREIGN PATENT DOCUMENTS

| | | |
|---|---|---|
| CN | 2773455 Y | 4/2006 |
| CN | 107327650 A | 11/2017 |

(Continued)

OTHER PUBLICATIONS

Communication pursuant to Article 94(3) EPC for Application No. 19192673.2 dated Dec. 8, 2020, 4 pages.

(Continued)

*Primary Examiner* — Vivek K Shirsat
(74) *Attorney, Agent, or Firm* — Jordan IP Law, LLC

(57) ABSTRACT

A duct includes a rigid air-permeable tube of composite material. The duct also includes a layer of insulation coupled to an exterior surface of the rigid air-permeable tube. The duct further includes a non-rigid insulation layer in contact with the layer of insulation. The non-rigid insulation layer forms an air-impermeable duct wall.

23 Claims, 19 Drawing Sheets

(56) References Cited

U.S. PATENT DOCUMENTS

| | | | |
|---|---|---|---|
| 2010/0044149 A1* | 2/2010 | Patel | F16L 55/033 |
| | | | 181/224 |
| 2010/0071289 A1* | 3/2010 | Princell | F16L 59/147 |
| | | | 52/309.6 |
| 2010/0209679 A1* | 8/2010 | Tompkins | B32B 5/26 |
| | | | 428/201 |
| 2011/0139289 A1* | 6/2011 | Qi | B29C 66/919 |
| | | | 138/149 |
| 2012/0261211 A1 | 10/2012 | Tomerlin et al. | |
| 2012/0267476 A1* | 10/2012 | Thomas | B64D 13/00 |
| | | | 244/1 N |
| 2013/0122244 A1* | 5/2013 | Patel | B29C 43/56 |
| | | | 428/116 |
| 2018/0017200 A1* | 1/2018 | Keough | B32B 5/26 |
| 2019/0270504 A1 | 9/2019 | Cedar et al. | |
| 2020/0056727 A1 | 2/2020 | Maben et al. | |
| 2020/0056803 A1 | 2/2020 | Vandyke et al. | |
| 2020/0190278 A1* | 6/2020 | Gardner | B32B 7/12 |

FOREIGN PATENT DOCUMENTS

| | | |
|---|---|---|
| WO | 2006045723 A1 | 5/2006 |
| WO | 2010149353 A1 | 12/2010 |

OTHER PUBLICATIONS https://www.youtube.com/watch?v=KcpXUKp9yOQ.
"1st Chinese Office Action Received For Application No. 201910663591.3", dated Mar. 16, 2020, 13 Pages.
Extended European Search Report for Application No. 19192686.4 dated Nov. 11, 2019, 8 pgs.
Extended European Search Report for Application No. 19192673.2 dated Nov. 6, 2019, 7 pgs.

* cited by examiner

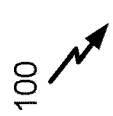

FIG. 1

Duct 102C
- Lenoweave tube 132
- Closed cell foam 134
- Rigid, perforated tube 136
- Foam Filled Honeycomb Core 144
  - Core structure 172
  - Cavities 174
  - Foam 176
- Air-impermeable duct wall 146
  - Thermoplastic film 162
  - Rigid tube 166

Duct 102B
- Biasing Member 122
- Insulation Layer 124
  - Open cell foam 152
  - Aramid Felt 154
  - High Mass Fabric 164
- Rigid tube of composite material 126

Duct 102A
- Rigid air-permeable tube of composite material 112
  - Lenoweave tube 132
  - Rigid, perforated tube 136
- Layer of Insulation 114
  - Open cell foam 152
  - Aramid Felt 154
- Non-rigid insulation layer 116
  - Thermoplastic Film 162
  - High Mass Fabric 164

100

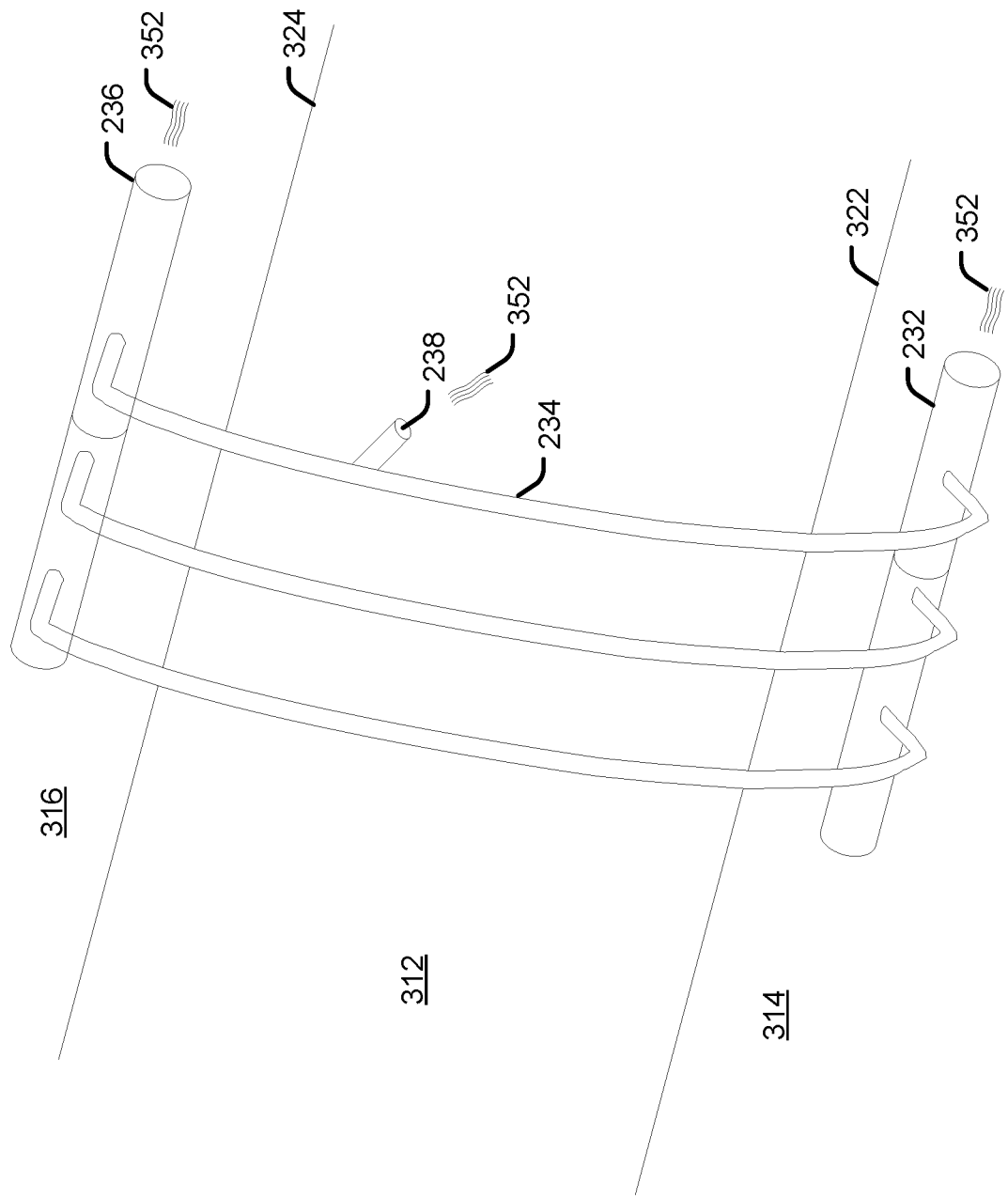

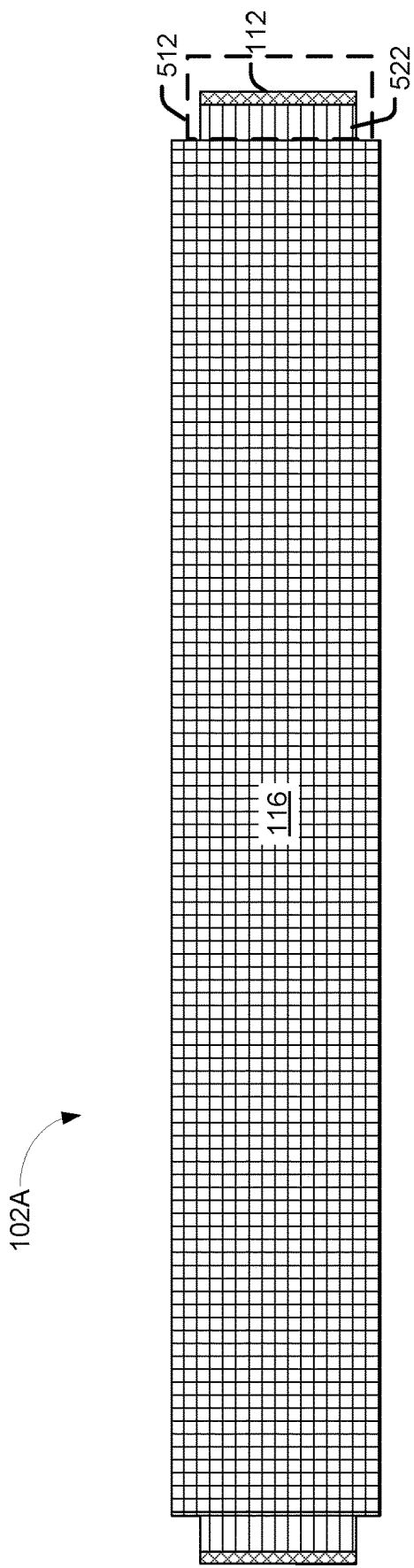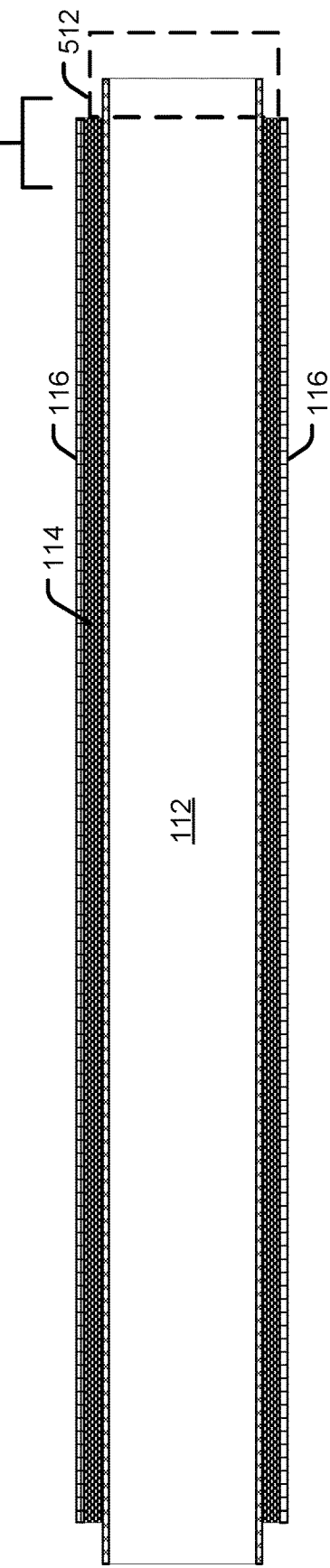
FIG. 5A
FIG. 5B

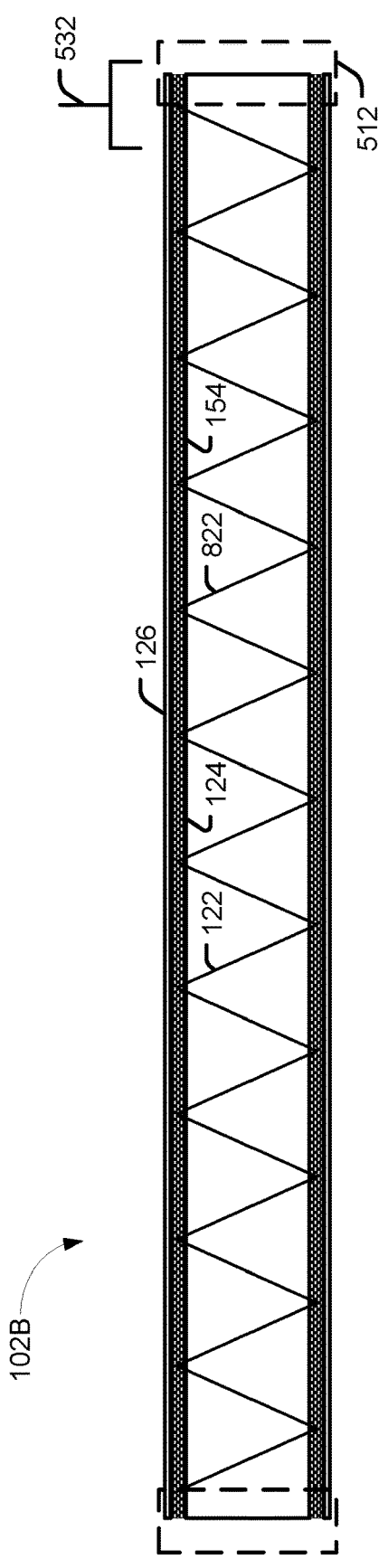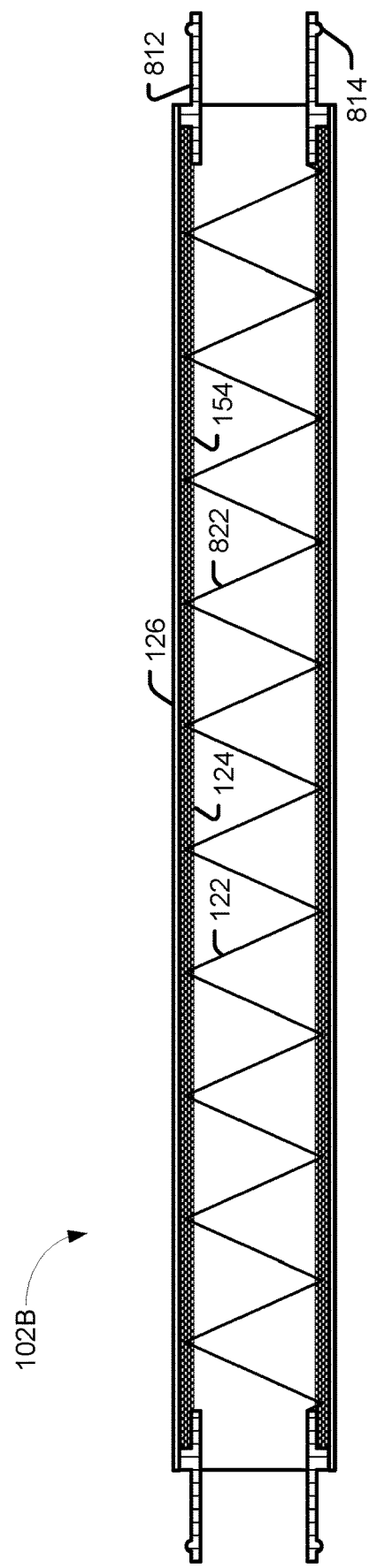
FIG. 8A
FIG. 8B

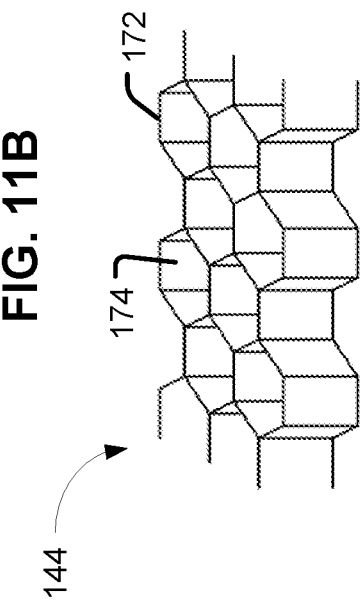
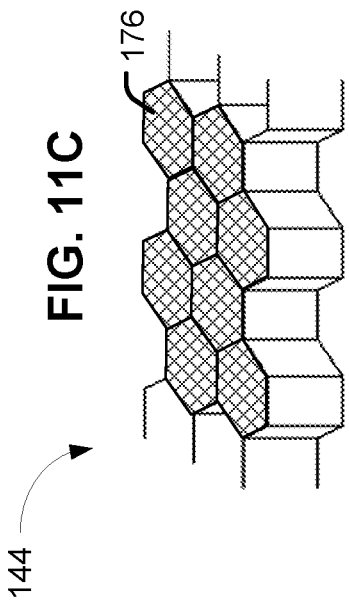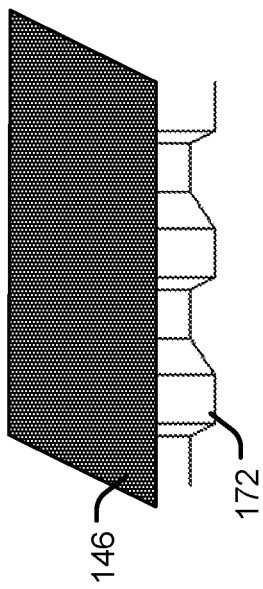
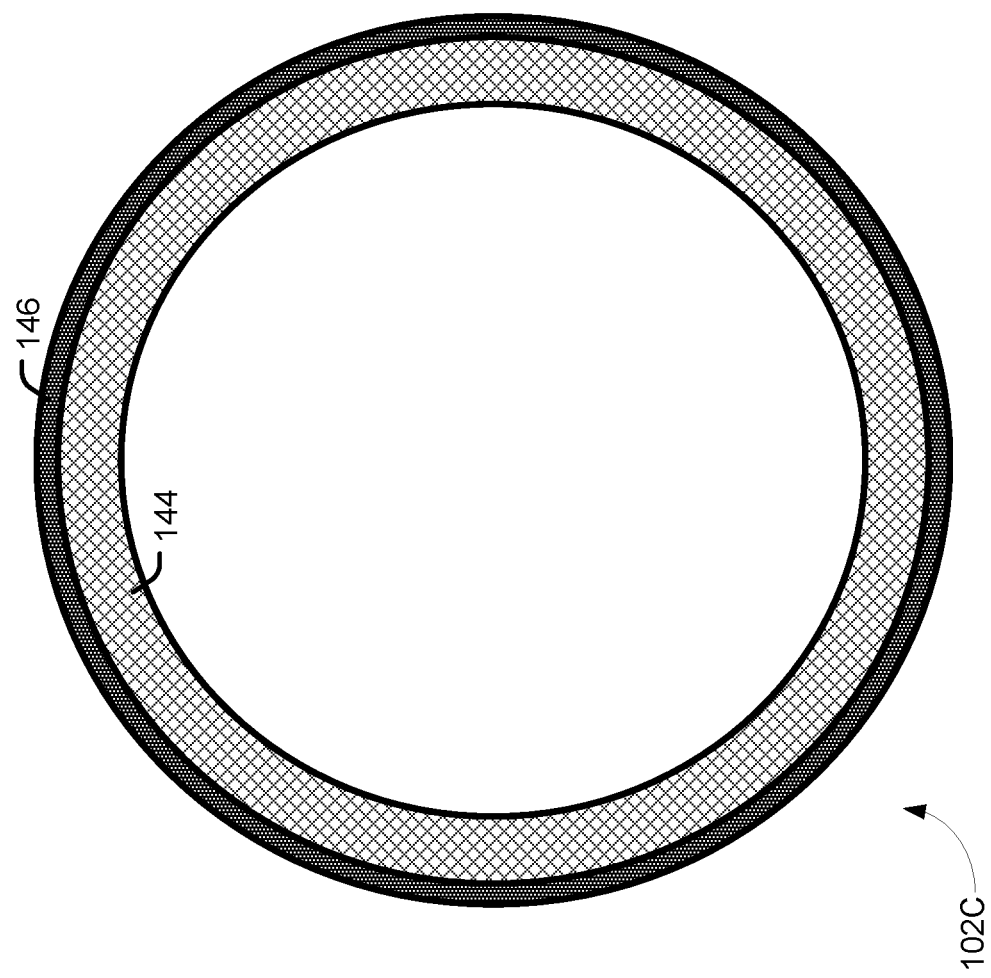

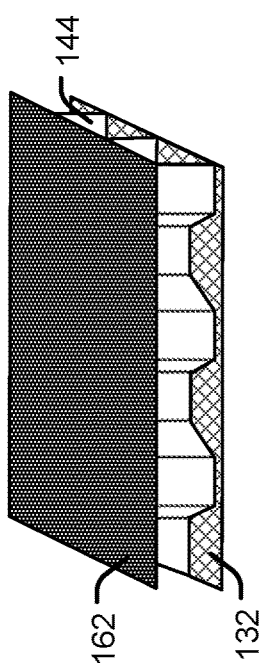
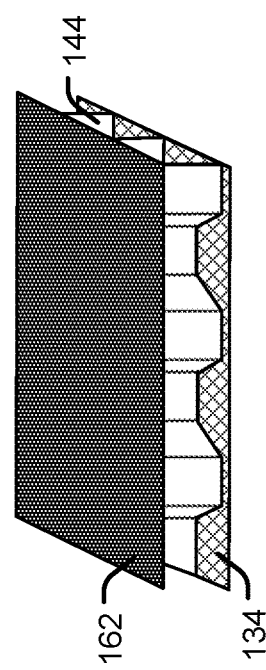
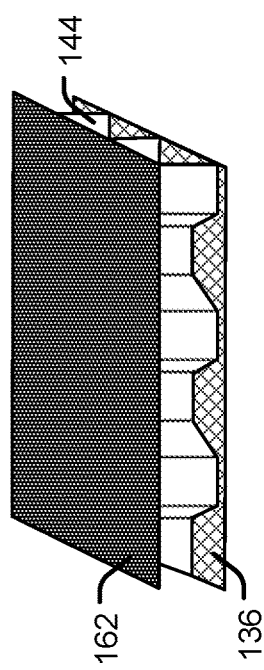
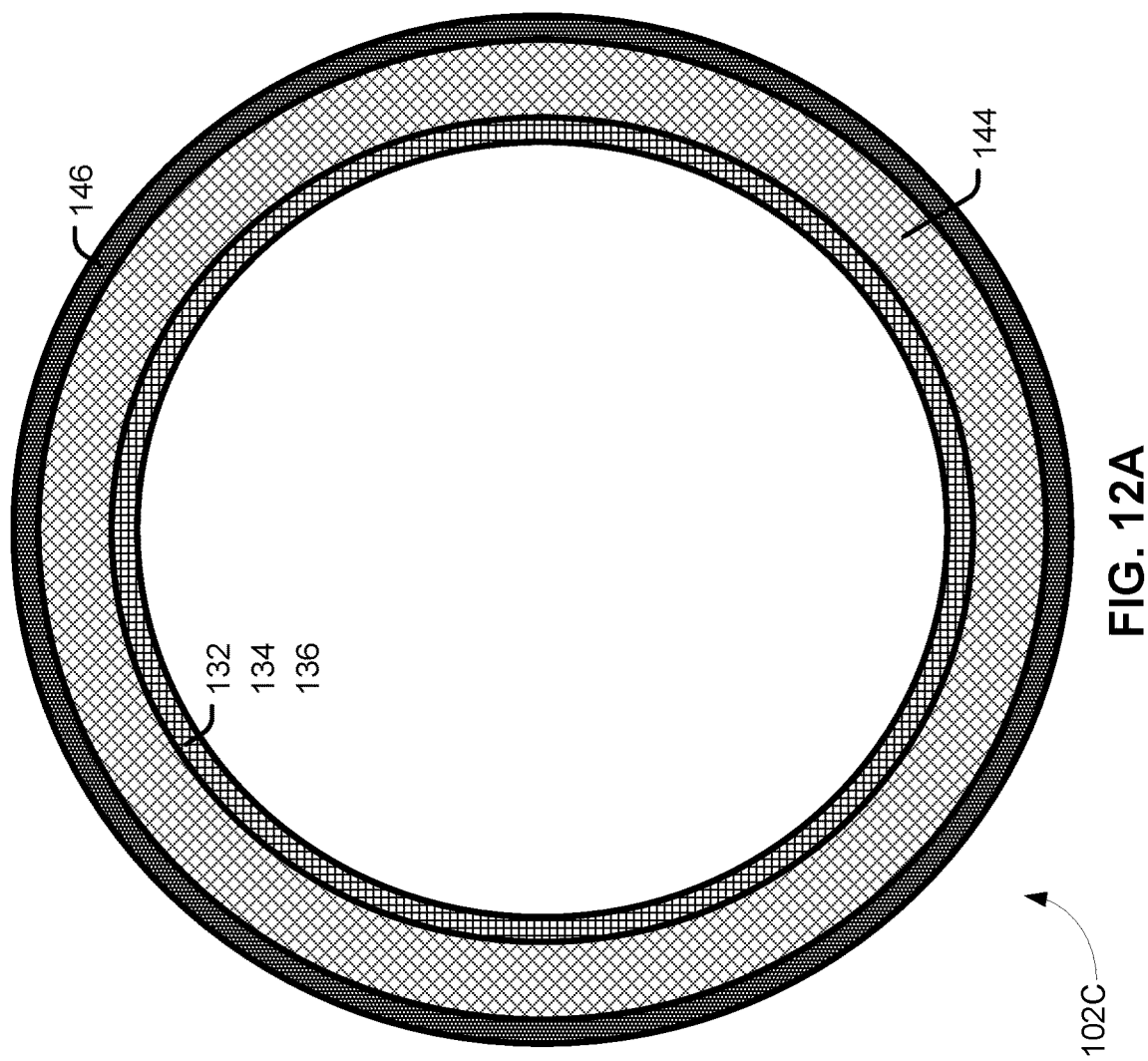

000000# SOUND ABSORBING DUCT FOR ENVIRONMENTAL CONTROL SYSTEM

FIELD OF THE DISCLOSURE

The present disclosure is generally related to ducts of an environmental control system that absorb sound.

BACKGROUND

Vehicles, such as aircraft, include environmental control systems to provide treated air to passengers, such as conditioned air, filtered air, etc. An environmental control system generally includes ducts to transport the treated air to passengers of the vehicle. The treated air moving within the ducts creates noise, which may decrease passenger comfort. Noise attenuating mufflers (e.g., zone mufflers) are often used to reduce (e.g., absorb) the noise generated by the moving air. For example, a muffler encases a duct of the environmental control system and attenuates noise using insulation and/or chambers. However, noise attenuating mufflers add weight, volume, and cost to environmental control systems. In high performance vehicles, such as aircraft, increased weight and volume increases costs and decreases performance.

SUMMARY

In a particular implementation, a duct includes a rigid air-permeable tube of composite material. The duct also includes a layer of insulation coupled to an exterior surface of the rigid air-permeable tube. The duct further includes a non-rigid insulation layer in contact with the layer of insulation. The non-rigid insulation layer forms an air-impermeable duct wall.

In another particular implementation, a duct includes a rigid tube of composite material. The duct also includes an insulation layer disposed within the rigid tube. The duct further includes a biasing member disposed within the rigid tube. The biasing member is configured to restrain the insulation layer against an interior surface of the rigid tube.

In a particular implementation, a method of manufacturing a duct includes applying insulation to an exterior surface of a rigid air-permeable tube of composite material to form a layer of insulation on the exterior surface of the rigid air-permeable tube. The method further includes applying non-rigid insulation to an exterior surface of the layer of insulation to form a non-rigid insulation layer in contact with the layer of insulation, the non-rigid insulation layer forming an air-impermeable duct wall.

In another particular implementation, a method of manufacturing a duct includes inserting insulation into a rigid tube of composite material to form a layer of insulation within the rigid tube. The layer of insulation is in contact with an inner surface of the rigid tube. The method further includes inserting a biasing member into the rigid tube of composite material to secure the layer of insulation within the rigid tube.

In yet another particular implementation, a duct includes a foam-filled honeycomb core structure having a tubular shape. The duct further includes an air-impermeable duct wall coupled to an exterior surface of the foam-filled honeycomb core structure.

In yet another particular implementation, a method of manufacturing a duct includes generating a honeycomb core structure having a tubular shape. The honeycomb core structure includes a plurality of hexagonal shaped cavities. The method also includes filling the plurality of hexagonal shaped cavities of the honeycomb core structure with foam to generate a foam-filled honeycomb core structure. The method further includes coupling an air-impermeable duct wall to an exterior surface of the foam-filled honeycomb core structure.

In a particular implementation, a method of installing a duct on a vehicle includes installing the duct in an environmental control system of the vehicle where the duct includes a foam-filled honeycomb core structure having a tubular shape and an air-impermeable duct wall coupled to an exterior surface of the foam-filled honeycomb core structure.

By using one of the ducts described herein, an environmental control system can more efficiently meet acoustic design requirements, achieve better thermal performance, achieve a lower weight and volume configuration, and reduce costs.

BRIEF DESCRIPTION OF THE DRAWINGS

FIG. 1 is a block diagram that illustrates examples of ducts;

FIG. 3 is a diagram that illustrates a perspective view of an example of the environmental control system of FIG. 2;

FIG. 5A is a diagram that illustrates a side view of an example of the duct of FIG. 4A;

FIG. 5B is a diagram that illustrates a cross-section view of the duct of FIG. 5A;

FIG. 8A is a diagram that illustrates a cross-section view of an example of the duct of FIG. 4B including a sleeve;

FIG. 8B is a diagram that illustrates a cross-section view of an example of the duct of FIG. 4B including an internal coupler;

FIG. 11A is a diagram that illustrates a cross-section view of an example of a duct including a foam-filled honeycomb core structure;

FIG. 11B is a diagram that illustrates the foam-filled honeycomb core structure including a plurality of cavities of the duct of FIG. 11A;

FIG. 11C is a diagram that illustrates the foam-filled honeycomb core structure including foam of the duct of FIG. 11A;

FIG. 11D is a diagram that illustrates the foam-filled honeycomb core structure and an air-impermeable duct wall of the duct of FIG. 11A;

FIG. 12A is a diagram that illustrates a cross-section view of an example of the duct of FIG. 11A including an interior layer;

FIG. 12B is a diagram that illustrates a particular example of the duct of FIG. 12A;

FIG. 12C is a diagram that illustrates another example of the duct of FIG. 12A;

FIG. 12D is a diagram that illustrates another example of the duct of FIG. 12A;

DETAILED DESCRIPTION

Figure 2:
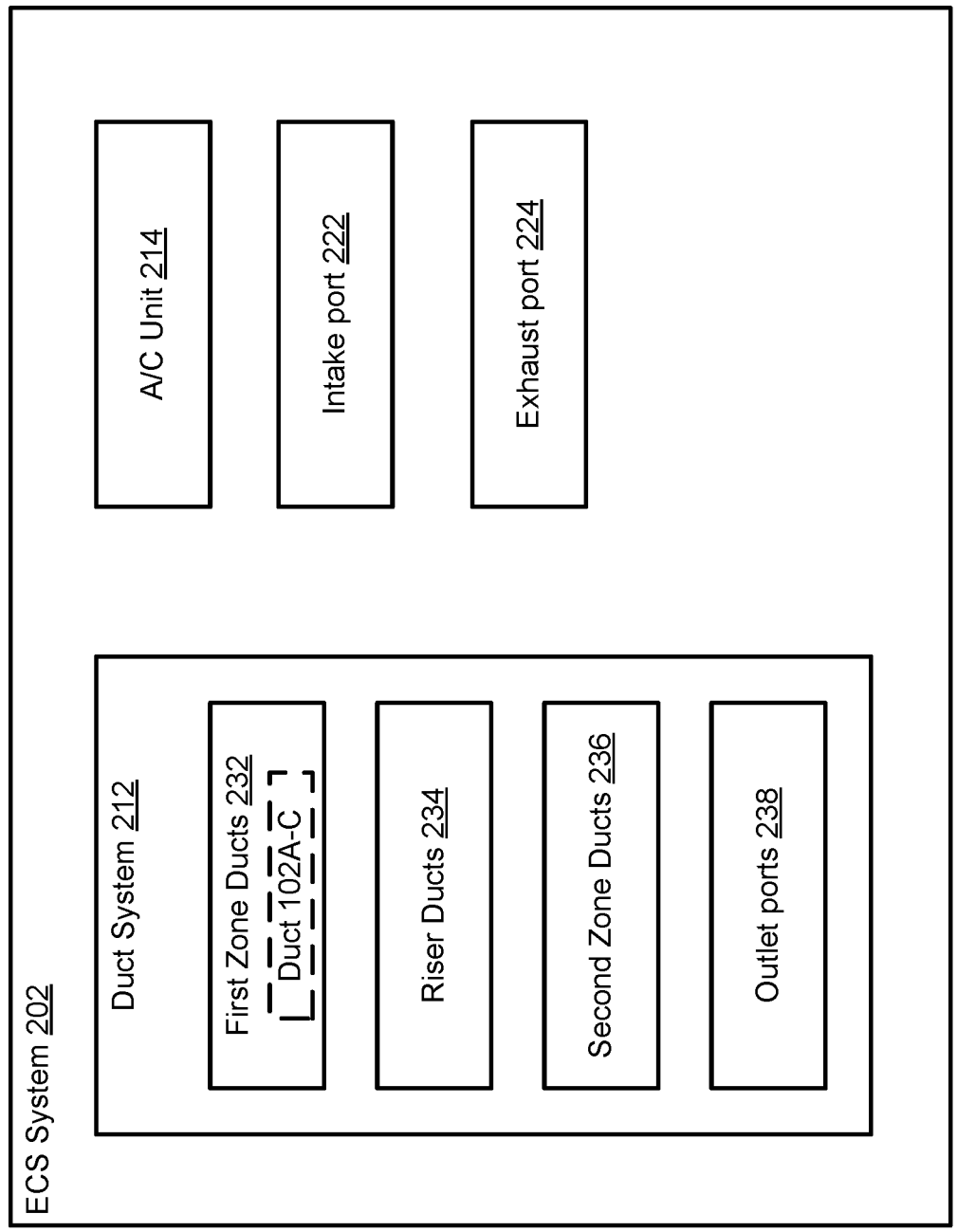
FIG. 2 is a block diagram of an aircraft that includes an example of an environmental control system including one of the ducts of FIG. 1.

The disclosed embodiments provide ducts that absorb sound for use in environmental control systems. Methods of manufacturing the ducts are also disclosed. A duct according to particular aspects discloses herein can function as a noise attenuating muffler and can reduce the use of dedicated noise attenuating mufflers in an environmental control system. For example, conventional ducts and noise attenuating mufflers may be replaced with the disclosed ducts.

In a first implementation, a first duct (e.g., a first type of duct) includes a rigid air-permeable tube of composite material forming an interior surface or wall of the first duct. The first duct also includes a layer of insulation (e.g., foam or felt) and a non-rigid outer liner. The non-rigid outer liner seals the ducts to form an air-impermeable duct wall and provides an outer layer or second layer of thermal and sound insulation. As compared to conventional ducts which include a rigid outer wall (or a rigid outer wall wrapped in non-rigid thermal insulation), the first duct includes a non-rigid outer liner that seals the duct and provides thermal insulation (and some sound absorption). As compared to conventional ducts, the first duct is lighter and less expensive to produce.

In a second implementation, a second duct (e.g., a second type of duct) includes a rigid tube of composite material and an insulation layer disposed within the rigid tube. The second duct further includes a biasing member (e.g., a spring) disposed within the rigid tube which secures the insulation layer against an interior surface of the rigid tube. Similar to the first duct, the second duct has one rigid component, i.e., the outer layer or tube. Conventional ducts often have two or more rigid components. Accordingly, as compared to conventional ducts, the second duct is lighter and less expensive to produce.

In a third implementation, a third duct (e.g., a third type of duct) includes a foam-filled honeycomb core structure having a tubular shape and an air-impermeable duct wall coupled to an exterior surface of the foam-filled honeycomb core structure. The foam-filled honeycomb core structure includes a plurality cavities filled with foam. The air-impermeable duct wall (e.g., thermoplastic film or rigid composite tube) is coupled to the foam-filled honeycomb core structure to seal the third duct. In some implementations, the third duct further includes an interior layer. For example, the third duct further includes a rigid air-permeable tube of composite material or a layer of foam as the interior layer. As compared to conventional ducts, the third duct is stronger and lighter because its "insulation layer," the foam-filled honeycomb core structure, provides structural support and stability. The foam-filled honeycomb core structure enables the air-impermeable duct wall to be a non-rigid outer liner (e.g., thermoplastic film) or a relatively thin layer of composite material (as compared to conventional ducts where the outer layer provides structural stability). For example, the composite material may be only one or two plies thick.

A technical effect of embodiments described herein enable an environmental control system to be lighter, smaller, or less expensive than other ducts not having at least some of these features. Accordingly, vehicles that include such environmental control system can be lighter, smaller, and less expensive.

FIG. 1 illustrates a block diagram 100 of examples of ducts 102. The ducts 102 may be include in an environmental control system, such as an environmental control system 202 of FIG. 2. The ducts 102 may be included in a vehicle, such as the aircraft 200 of FIG. 2.

The duct 102A includes a rigid air-permeable tube of composite material 112 (also referred to herein as a rigid air-permeable tube 112), a layer of insulation 114, and a non-rigid insulation layer 116. The rigid air-permeable tube of composite material 112 includes or corresponds to tube of composite material formed from "open" weave composite material or a rigid perforated tube 136. Open weave composite materials include composite material having an arrangement or pattern of fibers that is open loop. Examples of open loop arrangements include a leno weave arrangement (a.k.a., a gauze weave or cross weave arrangement). The leno weave arrangement is a type of plain weave in which adjacent "warp" fibers are twisted around consecutive "weft" fibers to form a spiral pair, effectively 'locking' each weft in place. An open weave composite material tube 132 includes (e.g., is formed from) a few plies of open weave composite material such that when the open weave composite material is cured the open weave composite material tube 132 contains openings in which air can pass through (i.e., is air-permeable). The air permeability of the open weave composite material tube 132 enables the duct 102A to absorb sound like a noise attenuating muffler.

The rigid perforated tube 136 includes a plurality of perforations (e.g., perforations 1312 of FIG. 13) such that air can pass through the perforations and the rigid perforated tube 136. In some implementations, the rigid perforated tube 136 includes or corresponds to a tube of composite material formed from "closed" weave composite materials.

The layer of insulation 114 is coupled to an exterior surface of the rigid air-permeable tube 112 and comprises a middle layer of the duct 102A. The layer of insulation 114 is configured to provide thermal insulation and/or sound absorption. The layer of insulation 114 includes a layer of foam or felt. As illustrative, non-limiting examples, the layer of insulation 114 includes open cell foam 152 or aramid felt 154.

In some implementations, the open cell foam 152 has a spiral wrapped configuration. To illustrate, the open cell foam 152 is in strips or triangles and is wrapped around the exterior of the rigid air-permeable tube of composite material 112. As an illustrative, non-limiting example, the open cell foam 152 includes or corresponds to melamine foam. The aramid felt 154 includes aramid fibers, such as meta-aramid fibers, para-aramid fibers, or a combination thereof, which are matted, condensed, and/or pressed together. As an illustrative, non-limiting examples, the aramid felt 154 may include or correspond to a meta-aramid felt (e.g., a Nomex felt material—Nomex is a registered trademark of DuPont) or a para-aramid felt.

The non-rigid insulation layer 116 is in contact with the layer of insulation 114, and the non-rigid insulation layer 116 forms an air-impermeable duct wall. The non-rigid insulation layer 116 is configured to provide thermal insulation and to seal the duct 102A. In some implementations, the non-rigid insulation layer 116 absorbs sound. The non-rigid insulation layer 116 includes or corresponds to a layer of thermoplastic film 162 or a layer of high mass fabric 164 that acts as an outer liner of the duct 102A. The layer of thermoplastic film 162 may include a polyetherketoneketone (PEKK) film, a polyether ether ketone (PEEK) film, a Poly Vinyl Fluoride (PVF), a non-flammable material pressure-sensitive tape, or a combination thereof (e.g., a first layer of PEKK film and a second layer of PEEK film). In some implementations, the layer of thermoplastic film 162 includes one to two plies or layers of thermoplastic material. The high mass fabric 162 as used herein includes materials made of natural or synthetic fibers that produce a fabric having an areal density (a.k.a., basis weight) greater than about 15 ounces per square yard. Such an areal density provides sound blocking (e.g., reducing or preventing break-out noise through a cross section of the duct), thermal insulation, and can act as an air-impermeable liner.

The duct 102B includes a biasing member 122, an insulation layer 124, and a rigid tube of composite material 126. The rigid tube of composite material 126 is configured to support the duct 102B. The rigid tube of composite material 126 may include or correspond an arrangement of composite material that is non-permeable and forms an air-impermeable exterior duct wall.

The biasing member 122 is disposed within the rigid tube of composite material 126 and is configured to restrain the insulation layer 124 within the rigid tube of composite material 126. For example, the biasing member 122 exerts a force (e.g., a radially outward force) that secures and restrains the insulation layer 124 against an interior surface of the rigid tube of composite material 126. In some implementations, the biasing member 122 includes or corresponds to a spring, such as the spring 822 of FIG. 8A and FIG. 8B. As an illustrative, non-limiting example, the biasing member 122 is a helical compression spring.

The insulation layer 124 is configured to absorb sound and provide thermal insulation. The insulation layer 124 includes the open cell foam 152, the aramid felt 154, the high mass fabric 164, or a combination thereof. As an illustrative, non-limiting example the insulation layer 124 includes a layer of Nomex felt.

The duct 102C includes a foam-filled honeycomb core structure 144 and an air-impermeable duct wall 146. The foam-filled honeycomb core structure 144 has a tubular shape. To illustrate, the foam-filled honeycomb core structure 144 defines an inlet and an outlet opposing the inlet. The foam-filled honeycomb core structure 144 has an interior surface and an exterior surface that opposes the interior surface. The foam-filled honeycomb core structure 144 includes a core structure 172 that defines a plurality of cavities 174, as depicted in FIGS. 11B-11D. The foam-filled honeycomb core structure 144 includes foam 176 within the plurality of cavities 174. The foam 176 may include or correspond to the open cell foam 152, a closed cell foam 134, or a combination thereof.

The air-impermeable duct wall 146 is coupled to an exterior surface of the foam-filled honeycomb core structure 144. The air-impermeable duct wall 146 is configured to seal the duct 102C. The air-impermeable duct wall 146 may be flexible or rigid. For example, the air-impermeable duct wall 146 may include or corresponds to a layer of the thermoplastic film 162, a layer of the high mass fabric 164, or a rigid tube 166. The rigid tube 166 can be made from composite materials, plastic, metal, of a combination there.

In some implementations, the duct 102C further includes an interior layer coupled to an interior surface of the foam-filled honeycomb core structure 144. For example, the duct 102C further includes the open weave composite material tube 132, a layer of closed cell foam 134, or the rigid perforated tube 136 coupled to the interior surface of the foam-filled honeycomb core structure 144.

In some implementations, the ducts 102A-102C include adhesive material, such as the adhesive material 522 of FIG. 5A, to couple a first duct to a second duct or another component via coupler, such as a sleeve 512 of FIG. 5A or FIG. 5B or an internal coupler 812 of FIG. 8B, as further described herein. Additionally or alternatively, the duct 102A includes adhesive tape, such as adhesive tape 622 of FIG. 6, coupled to the layer of insulation 114, to the non-rigid insulation layer 116, or to both. In addition, the duct 102B may include adhesive tape, such as the adhesive tape 622 of FIG. 6, coupled to the insulation layer 124. The ducts 102A-102C may be manufactured by exemplary methods of manufacturing described with reference to FIGS. 14-16.

In operation, the ducts 102A-102C are configured to transport treated air, provide thermal insulation, provide sound absorption, provide sound blocking, and provide structural integrity for positive and negative pressure applications. Operation of the ducts 102A-102C are described further with reference to FIG. 3.

FIG. 2 is a block diagram of an aircraft 200 that includes an example of an environmental control system (ECS) 202 which includes one of the ducts 102A-102C of FIG. 1. In other implementations, the ECS 202 is included on other vehicles, such as a rocket, a helicopter, a car, a bus, a train, a ship, a submarine, etc.

As illustrated in FIG. 2, the ECS 202 includes a duct system 212, an air conditioning unit 214, an intake port 222, and an exhaust port 224. The duct system 212 is configured to provide treated fluid (e.g., treated air 352 of FIG. 3) to passengers of the aircraft 200. The duct system 212 includes or more ducts. As illustrated in FIG. 2, the duct system 212 includes first zone ducts 232, riser ducts 234, second zone ducts 236, and outlet ports 238.

One or more of the first zone ducts 232, the riser ducts 234, and the second zone ducts 236 may include the ducts 102A-102C of FIG. 1. As illustrated in the implementation of FIG. 2, the first zone ducts 232 include at least one of the ducts 102A-102C of FIG. 1. The first zone ducts 232, the riser ducts 234, and the second zone ducts 236 are configured to transport fluid through the duct system 212.

The outlet ports 238 are configured to provide the fluid to the passengers. For example, the outlet ports 238 include or correspond to cabin or passenger vents. The outlet ports 238 may be controllable (e.g., opened or closed) by the passengers. The outlet ports 238 may be coupled to the first zone ducts 232, the riser ducts 234, the second zone ducts 236, or a combination thereof.

The air conditioning unit 214 is in fluid communication with the duct system 212 and is configured to condition or treat fluid (e.g., air) within the ECS 202. The intake port 222 is in fluid communication with the duct system 212 and is configured to intake or receive fluid (e.g., air) into the ECS 202. For example, the intake port 222 may intake fluid from within the aircraft 200 (e.g., a pressurized compartment and/or cabin of the aircraft 200) or from outside the aircraft 200 (e.g., ambient or unpressurized air).

The exhaust port 224 is in fluid communication with the duct system 212 and is configured to exhaust or expend fluid (e.g., air). For example, the exhaust port 224 may exhaust fluid outside of the aircraft 200 or out of the ECS 202 (e.g., exhaust to fluid to a filter or another system of the aircraft 200). Although the ECS 202 of FIG. 2 includes the air conditioning unit 214, in other implementations the ECS 202 may include other components (e.g., a heater, electrical equipment, an exhaust system, a fan, orifices, etc., or a combination thereof) in addition to or in the alternative of the air conditioning unit 214. Operation of the ECS 202 of FIG. 2 is described with reference to FIG. 3.

FIG. 3 is a diagram 300 that illustrates a particular example of the environmental control system (ECS) 202 of FIG. 2. In FIG. 3, the first zone ducts 232 are located below a cabin 312 (e.g., in an area 314 below a floor 322 of the cabin 312) of the aircraft 200, the riser ducts 234 are located between the cabin 312 and an exterior (e.g., skin) of the aircraft 200, the second zone ducts 236 are located above a ceiling 324 of the cabin 312 (e.g., in a crown 316 of the aircraft 200).

During operation, treated air 352 from the air conditioning unit 214 (and/or the intake port 222) is received by the first zone ducts 232. The first zone ducts 232 transport the treated air 352 through the first zone ducts 232 and to the riser ducts 234. As the treated air 352 moves through the first zone ducts 232, the treated air 352 generates noise. Additionally or alternatively, noise is generated by fans, duct geometry, flow control devices, object in a flow path of the treated air 352, or a combination thereof. The first zone ducts 232 attenuate the noise and provide thermal insulation such that heat of ambient air (e.g., air external to the ECS 202) is not transferred to the treated air 352 and that heat of the treated air 352 is not transferred to the ambient air.

The riser ducts 234 transport the treated air 352 through the riser ducts 234 and to the second zone ducts 236. In some implementations, the riser ducts 234 also transport the treated air 352 to the outlet ports 238, where the treated air 352 can be controlled by passengers. As the treated air 352 moves through the riser ducts 234, the treated air 352 generates noise. The riser ducts 234 attenuate the noise and provide thermal insulation.

The second zone ducts 236 transport the treated air 352 through the second zone ducts 236 and to air conditioning unit 214 (and/or exhaust port 224). In other implementations, the second zone ducts 236 transport the treated air 352 to the outlet ports 238, where the treated air 352 can be controlled by passengers. As the treated air 352 moves through the second zone ducts 236, the treated air 352 generates noise. The second zone ducts 236 attenuate the noise and provide thermal insulation.

As illustrated in FIG. 3, the exemplary ECS 202 is free of distinct noise attenuating mufflers (e.g., zone mufflers). For example, the ECS 202 does not include duct sections that have external noise attenuating mufflers encasing the duct sections and/or duct and dedicated noise attenuating muffler combination sections configured to absorb sound above or below the cabin 312, as in a conventional ECS.

Figure 4B:
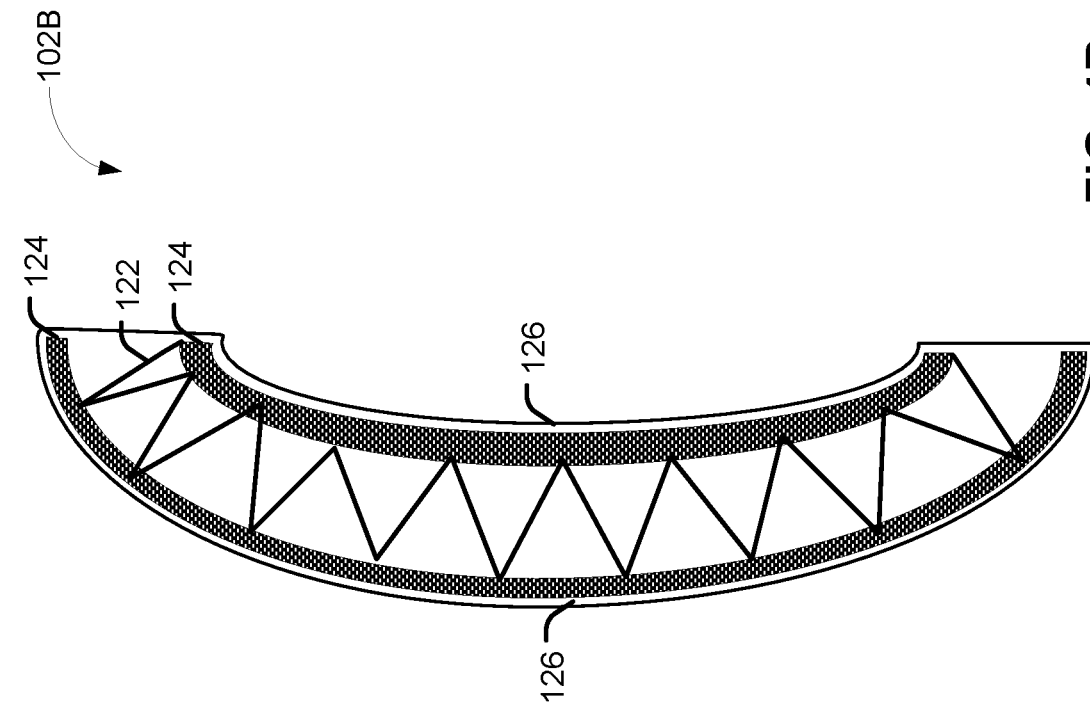
FIG. 4B is a diagram that illustrates a cross-section view of an example of another of the ducts of FIG. 1.
Figure 4A:
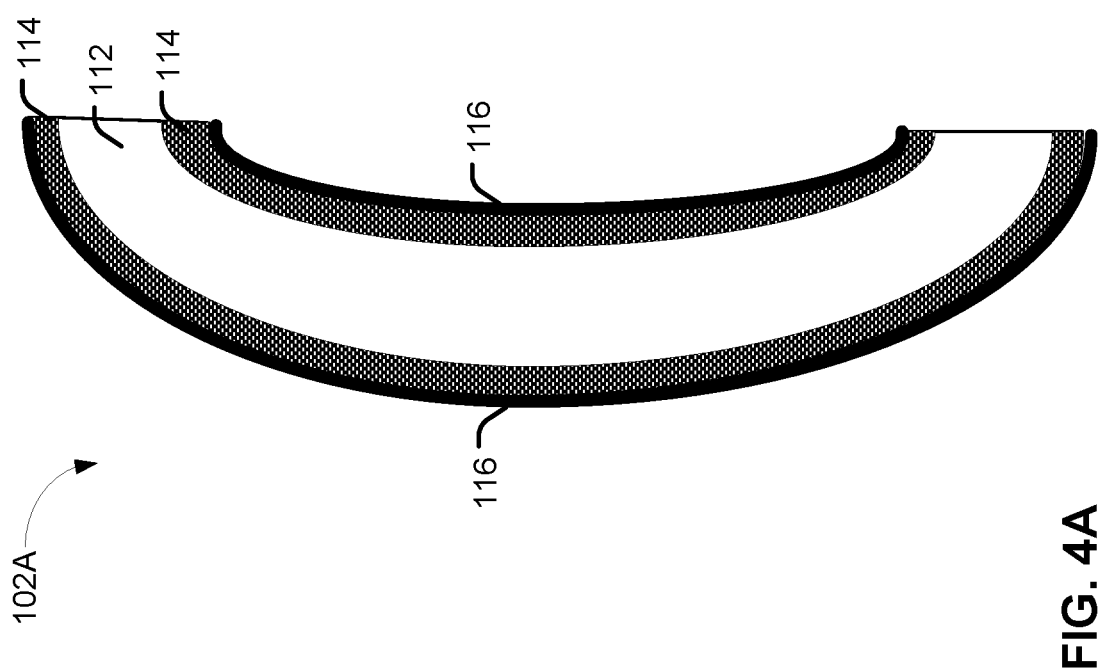
FIG. 4A is a diagram that illustrates a cross-section view of an example of one of the ducts of FIG. 1.

FIGS. 4A and 4B illustrate a cross-section view of an example of the duct 102A and an example of the duct 102B. In FIGS. 4A and 4B, the examples of the ducts 102A and 102B are curved. In other examples, such as in FIGS. 5 and 8, the ducts 102A-102C are straight. In FIG. 4A, the duct 102A includes the rigid air-permeable tube 112, the layer of insulation 114, the non-rigid insulation layer 116. In FIG. 4B, the duct 102B includes the biasing member 122, the insulation layer 124, and the rigid tube of composite material 126. Additional examples of the ducts 102A and 102B are illustrated in FIGS. 5A, 5B, 6, 7, 8A, 8B, 9, and 10.

FIGS. 5A and 5B illustrate a side view and a cross-section view (e.g., a longitudinal cross-section) of a particular example of the duct 102A. In FIGS. 5A and 5B, the duct 102A includes the rigid air-permeable tube 112, the layer of insulation 114, the non-rigid insulation layer 116, and a sleeve 512. The sleeve 512 is coupled to an exterior surface of the rigid air-permeable tube 112 via adhesive material 522. The sleeve 512 is configured to overlap a portion of an end of the rigid air-permeable tube 112 of the duct 102A and to overlap a portion of an end of a second duct 102A to couple the duct 102A and the second duct 102A in fluid communication.

The adhesive material 522 includes a material configured to bond the sleeve 512 to the rigid air-permeable tube 112. For example, the adhesive material 522 includes silicone or a pressure sensitive adhesive. As an illustrative, non-limiting example, the adhesive material 522 includes Room-Temperature-Vulcanizing (RTV) silicone. As illustrated in FIG. 5A, the adhesive material 522 is in contact with the rigid air-permeable tube 112, which extends past the layer of insulation 114 and the non-rigid insulation layer 116.

As illustrated in FIG. 5A, the sleeve 512 is smaller (e.g., has a smaller diameter) than the duct 102A (e.g., a diameter of the non-rigid insulation layer 116 thereof). In other implementations, the sleeve 512 is the same size as or is larger than the duct 102A (e.g., the diameter of the non-rigid insulation layer 116 thereof).

FIG. 5B depicts the cross-section view (e.g., a longitudinal cross-section) of the duct 102A of FIG. 5A. In FIG. 5B, an area 532 represents a portion of the duct 102A where adhesive tape, such as the adhesive tape 622 of FIG. 6, can be used to seal the joints or couplings between ducts 102A. For example, the adhesive tape (not shown) can be used to seal the edges between the ducts 102A and the sleeve 512, as further described with reference to FIG. 6. In other implementations, the duct 102A includes an internal coupler, such as internal coupler 812 of FIG. 8B, to couple to a second duct 102A, as described with reference to FIGS. 8B and 10.

Figure 6:
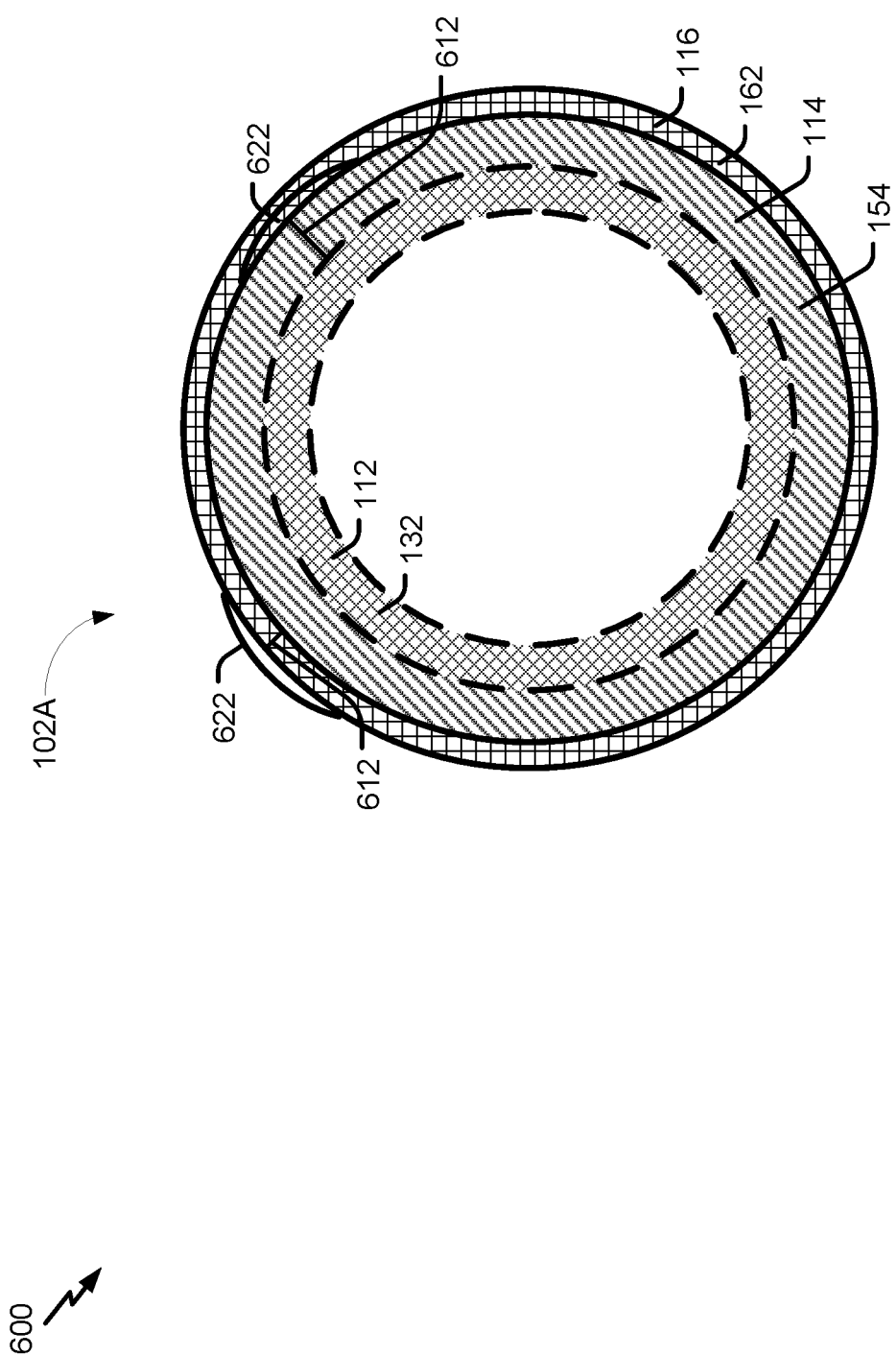
FIG. 6 is a diagram that illustrates a cross-section view of another example the duct of FIG. 4A.

FIG. 6 is a diagram 600 that illustrates a cross-section view (e.g., a transverse or circumferential cross-section) of another example of the duct 102A. In FIG. 6, the duct 102A includes the open weave composite material tube 132 for the rigid air-permeable tube 112, a layer of the aramid felt 154 for the layer of insulation 114, and a layer of the thermoplastic film 162 for the non-rigid insulation layer 116. In the example illustrated in FIG. 6, the layer of aramid felt 154 includes one ply of the Nomex felt and the layer of the thermoplastic film 162 includes one or two layers (e.g., plies) of a PEEK film.

The layer of the aramid felt 154 and the layer of the thermoplastic film 162 each form a seam 612. For example, the aramid felt 154 is wrapped around the open weave composite material tube 132 and creates the seam 612, and the thermoplastic film 162 is wrapped around the layer of aramid felt 154 and creates a seam 612.

In FIG. 6, the duct 102A further includes the adhesive tape 622 positioned proximate to (e.g., over) the seams 612. The adhesive tape 622 is configured to restrain the layer of insulation 114 (i.e., the layer of aramid felt 154), the non-rigid insulation layer 116 (i.e., the layer of thermoplastic film 162), or both. In some implementations, the adhesive tape 622 includes or corresponds to pressure sensitive tape. As an illustrative, non-limiting example, the adhesive tape 622 includes a metallized polyether ether ketone (MPEEK) material. In other implementations, the non-rigid insulation layer 116 includes a layer of the high mass fabric 164. For example, the non-rigid insulation layer 116 includes one to two layers (e.g., plies) of the high mass fabric 164 wrapped around the layer of the aramid felt 154.

Figure 7:
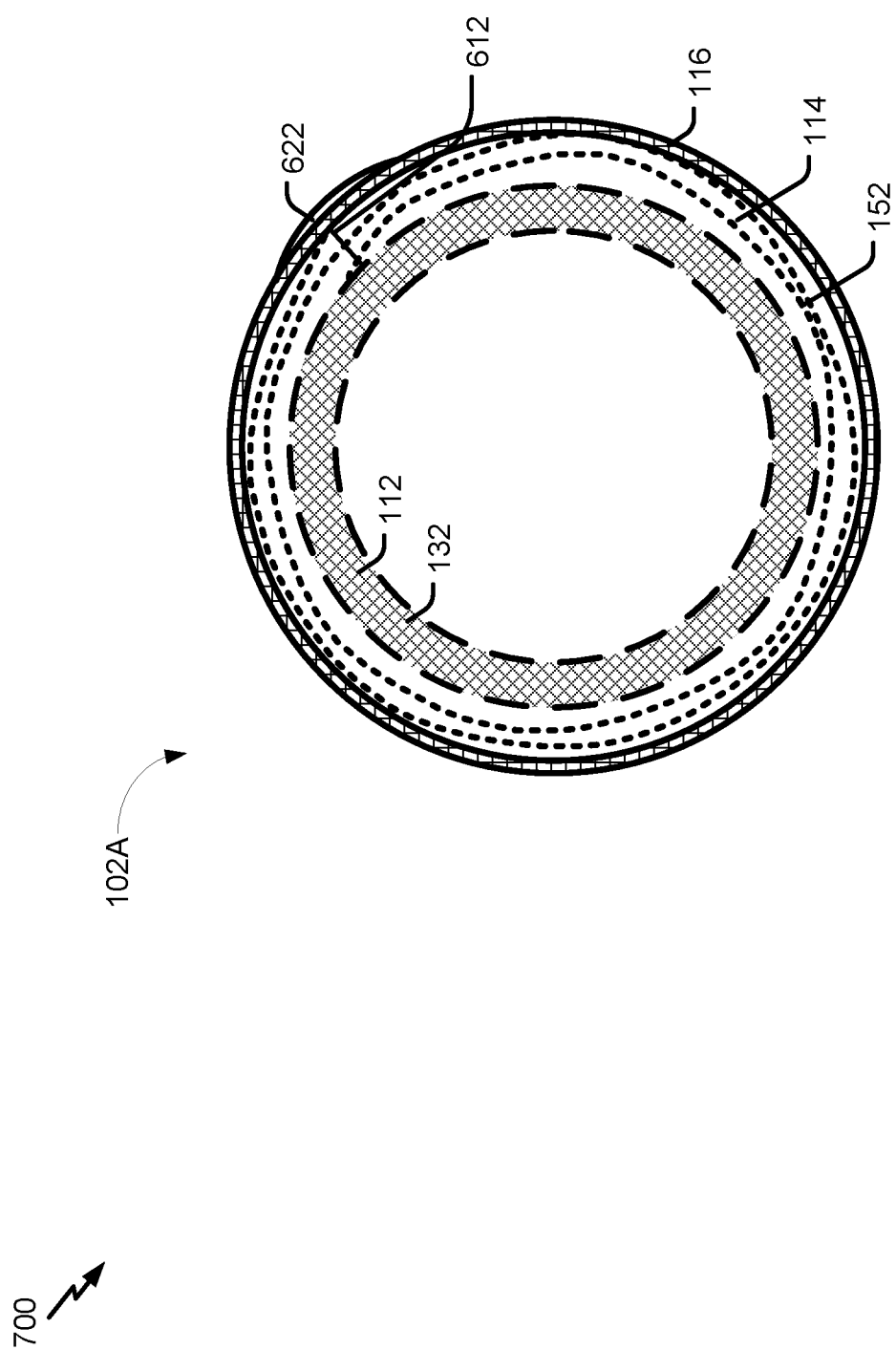
FIG. 7 is a diagram that illustrates a cross-section view of another example of the duct of FIG. 4A.

FIG. 7 is a diagram 700 that illustrates a cross-section view (e.g., a transverse or circumferential cross-section) of another example of the duct 102A. In FIG. 7, the duct 102A includes the open weave composite material tube 132 for the rigid air-permeable tube 112, a layer of the open cell foam 152 for the layer of insulation 114, and a layer of the thermoplastic film 162 for the non-rigid insulation layer 116. In the example illustrated in FIG. 6, the layer of the open cell foam 152 includes a layer of spiral wrapped melamine foam and the layer of the thermoplastic film 162 includes one or two layers (e.g., plies) of a PEEK film. In some implementations, the layer of spiral wrapped melamine foam includes multiple plies (e.g., three to four plies) of compressed melamine foam that is wrapped around the open weave composite material tube 132 in a spiral.

As compared to the duct 102A of FIG. 6 that includes the layer of the aramid felt 154, the duct 102A of FIG. 7 includes the layer of open cell foam 152. The layer of open cell foam 152 provides higher thermal resistance as compared to the aramid felt 154 or Nomex foam. Open cell foam 152 provides similar sound absorption to the aramid felt 154 at less cost and weight. The aramid felt 154 provides higher sound absorption (e.g., absorption and reduction of breakout noise) and transmission loss (e.g., noise reduction from an inlet of the duct 102A to an outlet of the duct 102A), as compared to a similar mass of the open cell foam 152.

FIGS. 8A and 8B each illustrate a cross-section view (e.g., a longitudinal cross-section) of an example of the duct 102B including a coupler. In FIGS. 8A and 8B the duct 102B includes a spring 822 for the biasing member 122, a layer of the aramid felt 154 for the insulation layer 124, and the rigid tube of composite material 126. In the example illustrated in FIGS. 8A and 8B, the spring 822 includes a helical compression spring and the layer of aramid felt 154 includes one ply of the Nomex felt.

Referring to FIG. 8A, a first example of the duct 102B including the sleeve 512 is illustrated. In FIG. 8A, the sleeve 512 (e.g., an external coupler) is in contact with an exterior of the duct 102B, that is an exterior surface of the rigid tube of composite material 126, as opposed to the sleeve 512 of FIG. 5A that is in contact with the exterior surface of the rigid air-permeable tube of composite material 112 of the duct 102A.

In FIG. 8B, a second example of the duct 102B includes an internal coupler 812. In some implementations, the internal coupler 812 includes threads (not shown), a bead 814, or a combination thereof, to couple and secure sections of ducts 102B together. As illustrated in FIG. 8B, the internal coupler 812 includes the bead 814 (e.g., a protrusion) which engages with a surface (internal surface) of a second duct 102B or a sleeve 512. The bead 814 exerts force to keep the ducts 102B together and generates friction which oppose the ducts 102B from decoupling. For example, the bead 814 exerts a force on the sleeve 512 that is coupled to the ducts 102B by a hose clamp or a plastic zip tie. The internal coupler 812 is described further with reference to FIG. 10.

Although, the ducts 102B are shown with two sleeves 512 or two internal couplers 812 in FIGS. 8A and 8B, in other implementations, a particular duct (e.g., one of the ducts 102A-102C) can include one sleeve 512 and one internal coupler 812.

Figure 9:
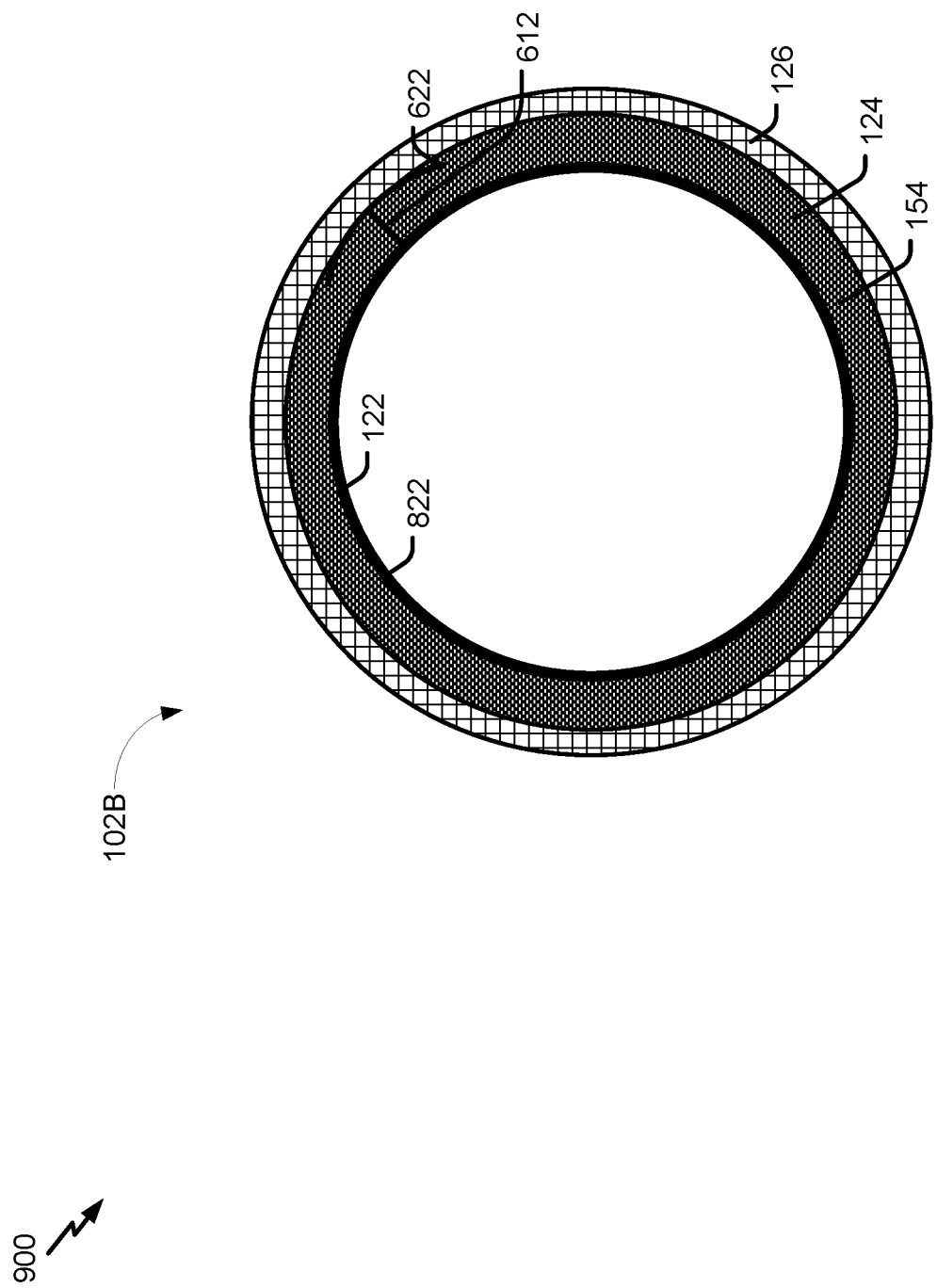
FIG. 9 is a diagram that illustrates a cross-section view of a particular example of the duct of FIG. 4B.

FIG. 9 is a diagram 900 that illustrates a cross-section view (e.g., a transverse or circumferential cross-section) of a particular example of the duct 102B. In FIG. 9, the duct 102B includes the spring 822 for the biasing member 122, a layer of the aramid felt 154 for the insulation layer 124, and the rigid tube of composite material 126. In the example illustrated in FIG. 9, the layer of aramid felt 154 includes one ply of the Nomex felt.

Figure 10:
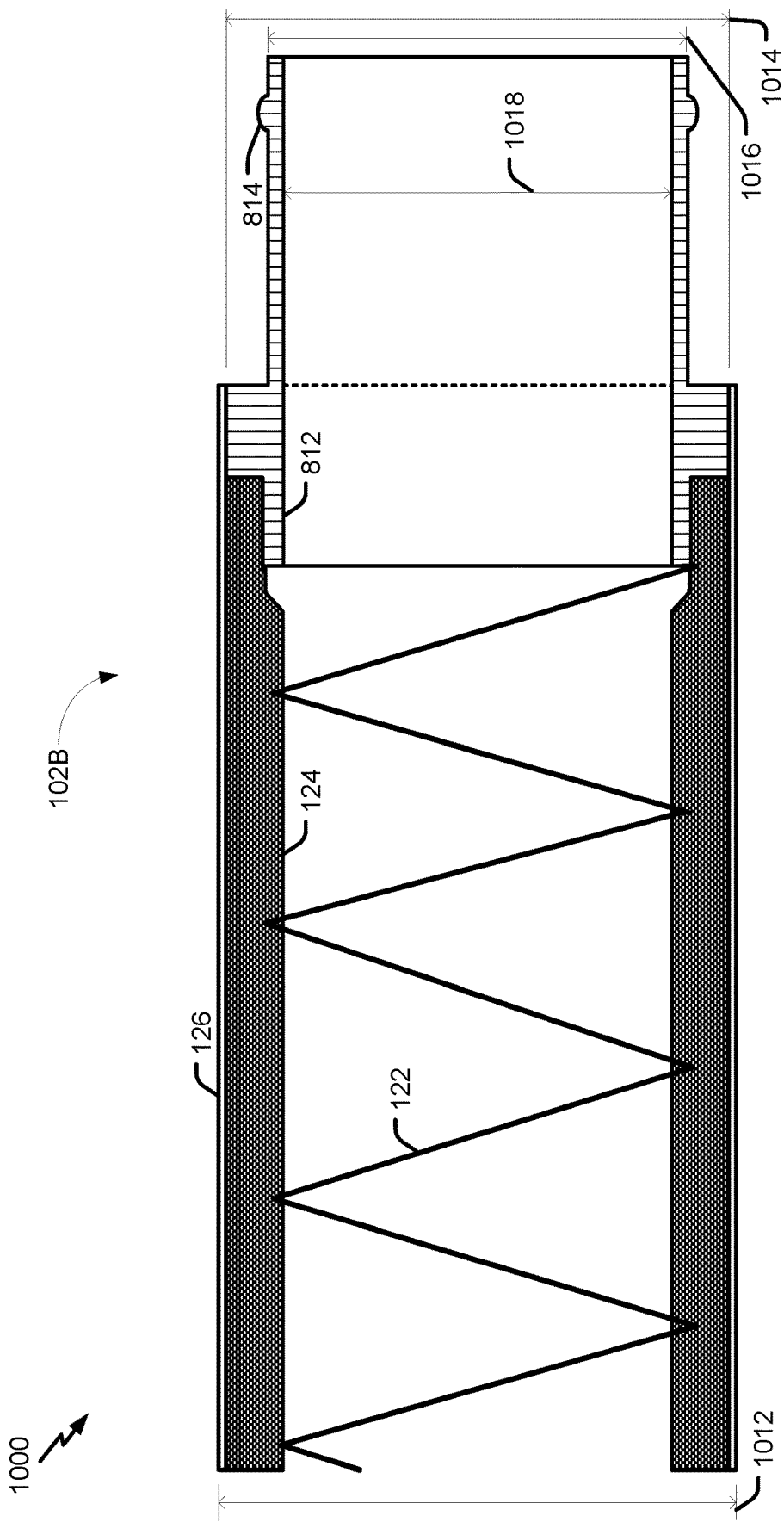
FIG. 10 is a diagram that illustrates a detailed cross-section view of a duct including an example of an internal coupler.

FIG. 10 is a diagram 1000 that illustrates a detailed cross-section view (longitudinal cross-section) of the internal coupler 812 of FIG. 8B. In FIG. 10, the internal coupler 812 is a "reducer," i.e., the internal coupler 812 reduces an outside diameter 1012, 1014 of the ducts 102B. To illustrate, a first outside diameter 1012 of the first duct 102B is larger than a second outside diameter 1014 of an interior portion of the internal coupler 812 (and of a second duct 102B which is coupled to the ducts 102B via the internal coupler 812. An exterior portion (e.g., a portion near the bead 814) of the internal coupler 812 has an outside diameter, a third outside diameter 1016, that is less than the first outside diameter 1012 of the first duct 102B and the second outside diameter 1014 of the interior portion of the internal coupler 812. In some implementations, the second duct 102B and/or a sleeve (e.g., the sleeve 512) is coupled to internal coupler 812 and contacts the bead 814. The second duct 102B and/or the sleeve 512 may be secured to the first duct 102B by a hose clamp or a plastic zip tie.

In FIG. 10, an inside diameter 1018 of the duct 102B and the second duct 102B remains the same. In other implementations, the internal coupler 812 has an inside diameter 1018 that is smaller than the inside diameter 1018 of the duct 102B and the internal coupler 812 reduces the inside diameter 1018 of the second duct 102B in addition or in the alternative to reducing the first outside diameter 1012 of the ducts 102B. The internal coupler 812 includes a polymer, a composite material, a metal, or a combination thereof.

FIGS. 11A-11D illustrate a particular example of the duct 102C and the foam-filled honeycomb core structure 144 thereof. FIG. 11A is a diagram that illustrates a cross-section view of the duct 102C. In FIG. 11A, the duct 102C has the foam-filled honeycomb core structure 144 and the air-impermeable duct wall 146. The foam-filled honeycomb core structure 144 includes the plurality of cavities 174, as illustrated in FIG. 11B.

FIG. 11B depicts surfaces of the foam-filled honeycomb core structure 144 defining the plurality of cavities 174. The plurality of cavities 174 have a hexagonal shape (e.g., a honeycomb shape). In other implementations, one or more of the plurality of cavities 174 have other shapes, such as a circular shape, a rectangular shape, a square shape, a pentagonal shape, an octagonal shape, another shape that may be tessellated, or a combination thereof. The plurality of cavities 174 are illustrated in FIG. 11B as extending through the foam-filled honeycomb core structure 144, i.e., the plurality of cavities 174 correspond to through holes and are defined by both surfaces of the foam-filled honeycomb core structure 144. In other implementations, the plurality of cavities 174 do not extend through the foam-filled honeycomb core structure 144. In a particular implementation, each of the surfaces of the foam-filled honeycomb core structure 144 defines a corresponding plurality of cavities 174.

FIG. 11C depicts the foam 176 in the plurality of cavities 174 of the foam-filled honeycomb core structure 144. As illustrated in FIG. 11C, the foam 176 (e.g., the closed cell foam 134 or the open cell foam 152 extends to the surfaces of the foam-filled honeycomb core structure 144. In other implementations, the foam 176 terminates before or extends past the surfaces of the foam-filled honeycomb core structure 144. The foam 176 may be grown in-situ (i.e., within the plurality of cavities 174) or may be inserted into the plurality of cavities 174.

The foam-filled honeycomb core structure 144 (e.g., portions thereof) includes one or more layers (e.g., the air-impermeable duct wall 146) coupled to the surfaces of the foam-filled honeycomb core structure 144 that define the plurality of cavities 174, as illustrated in FIG. 11D. In a particular implementation, the air-impermeable duct wall 146 includes composite material.

FIG. 12A illustrates a cross-section view of an example of the duct 102C including an interior layer. In FIG. 12A, the duct 102C includes the foam-filled honeycomb core structure 144, the air-impermeable duct wall 146, and one of the interior layers described with reference to FIG. 1. For example, the duct 102C includes one of the open weave composite material tube 132, the layer of closed cell foam 134, or the rigid perforated tube 136.

FIG. 12B depicts an example of the duct 102C of FIG. 12A the foam-filled honeycomb core structure 144 positioned (e.g., sandwiched) between two layers. In FIG. 12B, the foam-filled honeycomb core structure 144 is positioned between the open weave composite material tube 132 and a layer of the thermoplastic film 162.

FIG. 12C depicts another example of the duct 102C of FIG. 12A where the foam-filled honeycomb core structure 144 is positioned between the layer of closed cell foam 134 and a layer of the thermoplastic film 162.

FIG. 12D depicts another example of the duct 102C of FIG. 12A where the foam-filled honeycomb core structure 144 is positioned between the rigid perforated tube 136 and a layer of the thermoplastic film 162.

Figure 13:
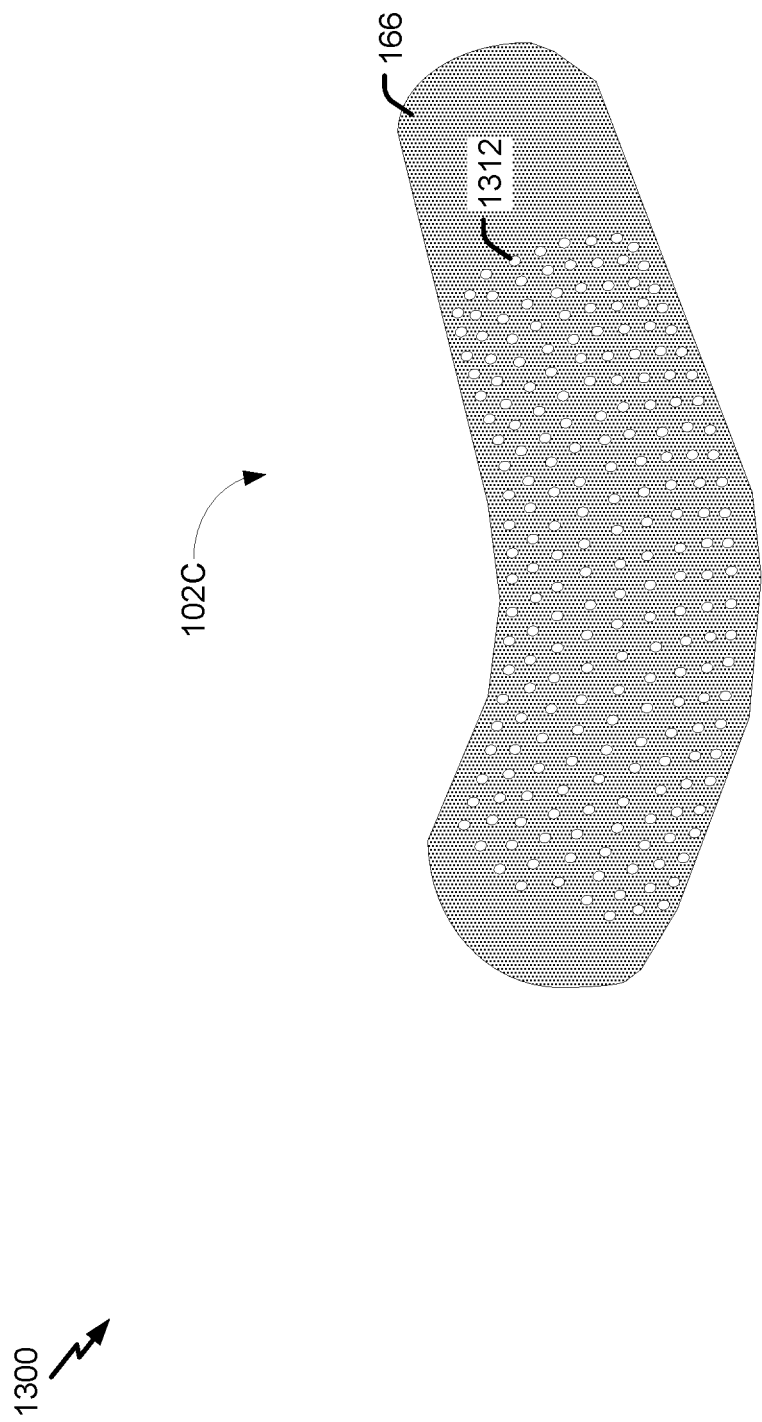
FIG. 13 is a diagram that illustrates an example of perforations of a rigid tube of a duct.

FIG. 13 is a diagram 1300 that illustrates an example of the perforations 1312 of the rigid tube 166 of the duct 102C. As illustrated in FIG. 13, the duct 102C is curved and the perforations 1312 have a circular cross-section. In other implementations, the duct 102C is straight and/or the perforations 1312 have a cross-section that is non-circular, such as an elliptical cross-section, a rectangular cross-section, a square cross-section, a triangular cross-section, or a hexagonal cross-section. In some implementations, the perforations 1312 are arranged in a pattern. For example, the perforations 1312 can be arranged in an asymmetrical pattern or a symmetrical pattern. To illustrate, when the perforations 1312 are symmetrical, the perforations 1312 may be symmetrical with respect to an axis or curvature of the duct 102C.

The perforations 1312 are configured to allow air and/or sound waves to pass from an interior of the rigid tube 166 to another layer of the duct 102C. The perforations 1312 of the rigid tube 166 enable the duct 102C to function similar to a muffler, i.e., to reduce sound generated by air moving through the duct 102C and an ECS. To illustrate, as a sound wave propagates to the perforations 1312, a portion of the sound wave passes through the perforations 1312 to an insulation layer or material of the duct 102C where it is absorbed.

In some implementations, the perforations 1312 are sized to cause destructive interference (i.e., reduce noise by canceling out sound waves generated by the air moving through duct 102C). To illustrate, when the sound wave propagates to the perforations 1312, another portion of the sound wave is reflected back into the interior of the rigid tube 166. The other portion of the sound wave may cause destructive interference with another sound wave and may cancel out at least a portion of the other sound wave. A size of the perforations 1312 is based on a size (e.g., length and/or diameter) of the rigid tube 166, a speed of the air, a pressure of the air, or a combination thereof.

Figure 14:
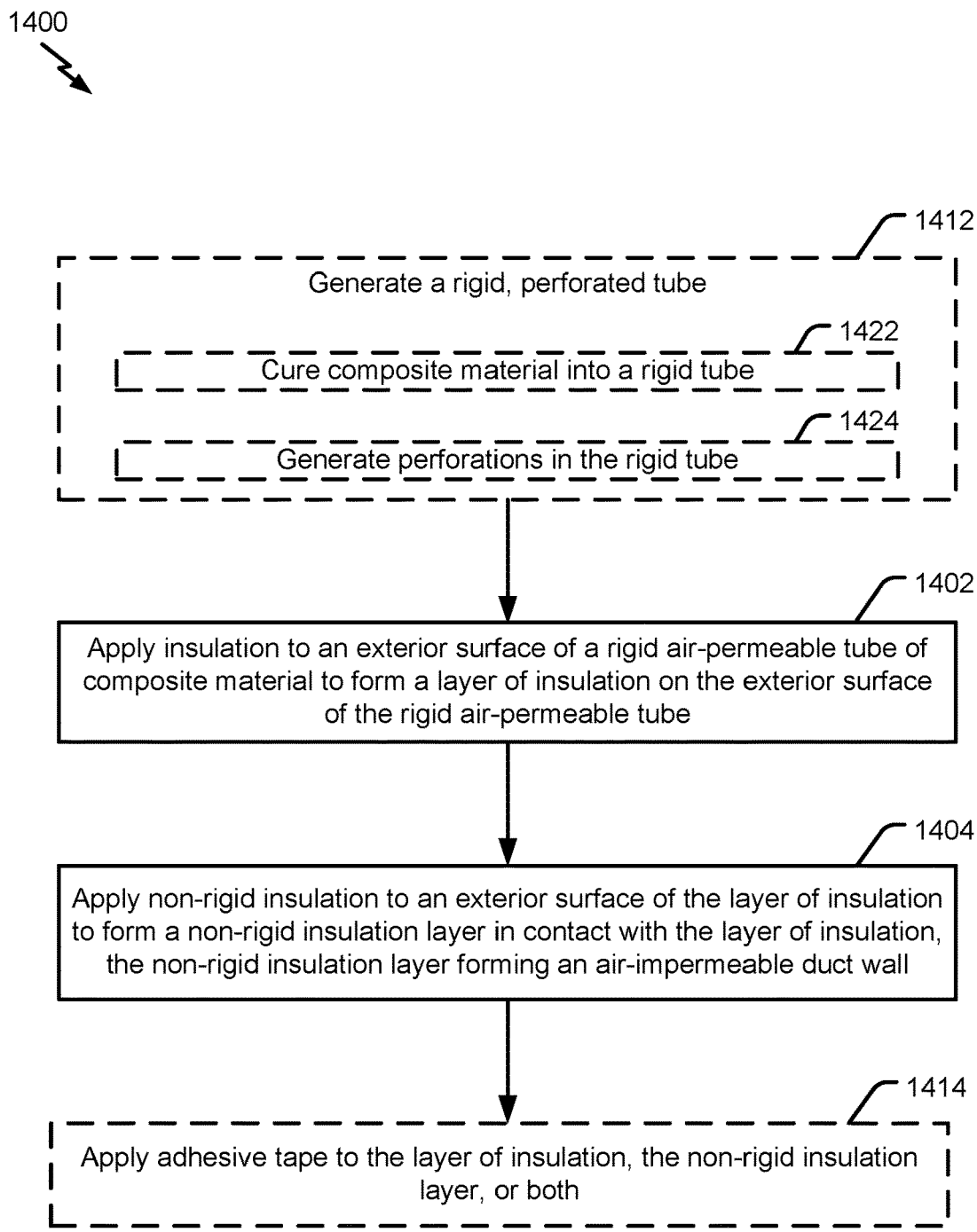
FIG. 14 is a flow chart of an example of a method of manufacturing a duct.

FIG. 14 illustrates a particular example of a method 1400 of manufacturing a duct, such as the ducts 102A of FIG. 1. The method 1400 includes, at 1402, applying insulation to an exterior surface of a rigid air-permeable tube of composite material to form a layer of insulation on the exterior surface of the rigid air-permeable tube. For example, the layer of insulation may include or correspond to the layer of insulation 114, the open cell foam 152, or the aramid felt 154 of FIG. 1. The rigid air-permeable tube of composite material may include or correspond to the rigid air-permeable tube of composite material 112 of FIG. 1. To illustrate, the layer of insulation 114 is formed by wrapping insulation (e.g., the open cell foam 152, the aramid felt 154, or both) around the outside or exterior of the rigid air-permeable tube of composite material 112. In a particular implementation, the composite material of the rigid air-permeable tube 112 includes a fabric material having a leno weave arrangement. In a particular implementation, after the insulation is applied, a leak check or test is performed on the combined rigid air-permeable tube and layer of insulation.

The method 1400 further includes, at 1404, applying non-rigid insulation to an exterior surface of the layer of insulation to form a non-rigid insulation layer in contact with the layer of insulation, the non-rigid insulation layer forming an air-impermeable duct wall. For example, the non-rigid insulation layer may include or correspond to the non-rigid insulation layer 116, the thermoplastic film 162, or the high mass fabric 164 of FIG. 1. To illustrate, the non-rigid insulation layer is formed by is wrapping the non-rigid insulation (e.g., the thermoplastic film 162 or the high mass fabric 164) around the outside or exterior of the layer of insulation 114.

In some implementations, the rigid air-permeable tube comprises a rigid, perforated tube of composite material. In such implementations, the method 1400 includes, prior to applying 1402 the insulation to the exterior surface of a rigid air-permeable tube, generating 1412 the rigid, perforated tube. In some such implementations, generating 1412 includes curing 1422 the composite material into a rigid tube and generating 1424 perforations in the rigid tube to form the rigid, perforated tube. To illustrate, composite material is applied to an exterior surface of a tubular tool or mandrel and the composite material is cured to form the rigid tube by applying heat, light, pressure (plenum pressure or vacuum pressure), or a combination thereof to the composite material. Perforations are generated in the rigid tube by machining the rigid tube to form the rigid, perforated tube of composite material.

In other implementations, generating 1412 includes applying the composite materials onto a tool to form the rigid, perforated tube such that the perforations are formed during curing of the composite materials. For example, a tool used as the layup surface for the composite materials includes protrusions such that the when the composite material is cured, the protrusions case perforations in the rigid, perforated tube.

In some implementations, the method 1400 further includes, at 1414, applying adhesive tape to the layer of insulation, the non-rigid insulation layer, or both, to secure the layer of insulation to the rigid air-permeable tube, to secure the non-rigid insulation layer to the layer of insulation, or both. For example, the adhesive tape includes or corresponds to the adhesive tape 622 of FIG. 6. To illustrate, 1 ply of MPEEK adhesive tape is placed along the seams 612 of the layer of insulation 114 and of the non-rigid insulation layer 116 to secure the layers and to seal the duct 102A.

Figure 15:
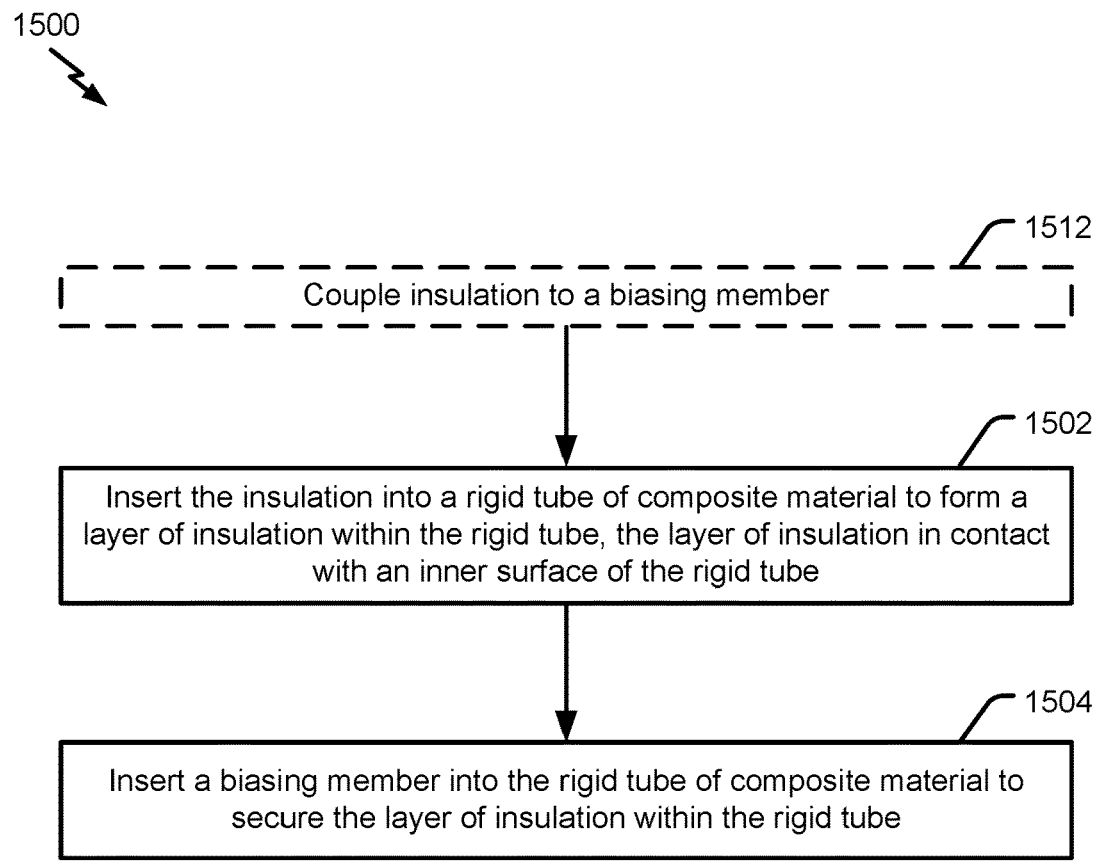
FIG. 15 is a flow chart of another example of a method of manufacturing a duct.

FIG. 15 illustrates another example of a method 1500 of manufacturing a duct, such as the ducts 102B of FIG. 1. The method 1500 includes, at 1502, inserting insulation into a rigid tube of composite material to form a layer of insulation within the rigid tube, the layer of insulation in contact with an inner surface of the rigid tube. For example, the layer of insulation may include or correspond to the insulation layer 124, the open cell foam 152, the aramid felt 154, or the high mass fabric 164 of FIG. 1. The rigid tube of composite material may include or correspond to the rigid tube of composite material 126 of FIG. 1. To illustrate, the insulation layer 124 is formed by wrapping insulation (e.g., the open cell foam 152, the aramid felt 154, the high mass fabric 164, or a combination thereof) around the inside or interior of the rigid tube of composite material 126.

The method 1500 further includes, at 1504, inserting a biasing member into the rigid tube of composite material to secure the layer of insulation within the rigid tube. For example, the biasing member may include or correspond to the biasing member 122 or the spring 822 of FIG. 8A and FIG. 8B. To illustrate, the biasing member 122 is inserted into the inside or interior of the rigid tube of composite material 126 via and inlet or outlet of the rigid tube of composite material 126. In some such implementations, the insulation may be coupled or secured to the rigid tube of composite material 126 by the adhesive tape 622 or the insulation may couple to itself by the adhesive tape 622 to form a tubular shape and the insulation layer 124.

In some implementations, the method 1500 includes, prior to inserting the insulation, coupling 1512 the insulation to the biasing member. To illustrate, the insulation (e.g., the open cell foam 152, the aramid felt 154, the high mass fabric 164, or a combination thereof) is wrapped around or applied to the exterior or outside of the biasing member 122 to form the insulation layer 124, and then, the combined insulation layer 124 and the biasing member 122 is inserted into the rigid tube of composite material 126 to form the duct 102B. For example, the insulation layer 124 and the biasing member 122 are inserted into the rigid tube of composite material 126 as a unitary piece. In some such implementations, the insulation may be coupled or secured to the biasing member 122 by the adhesive tape 622. Alternatively, adhesive material 522 couples or secures the insulation to the biasing member 122 or the biasing member 122 (e.g., the spring 822) is threaded through the insulation to couple or secure the insulation to the biasing member 122.

Figure 16:
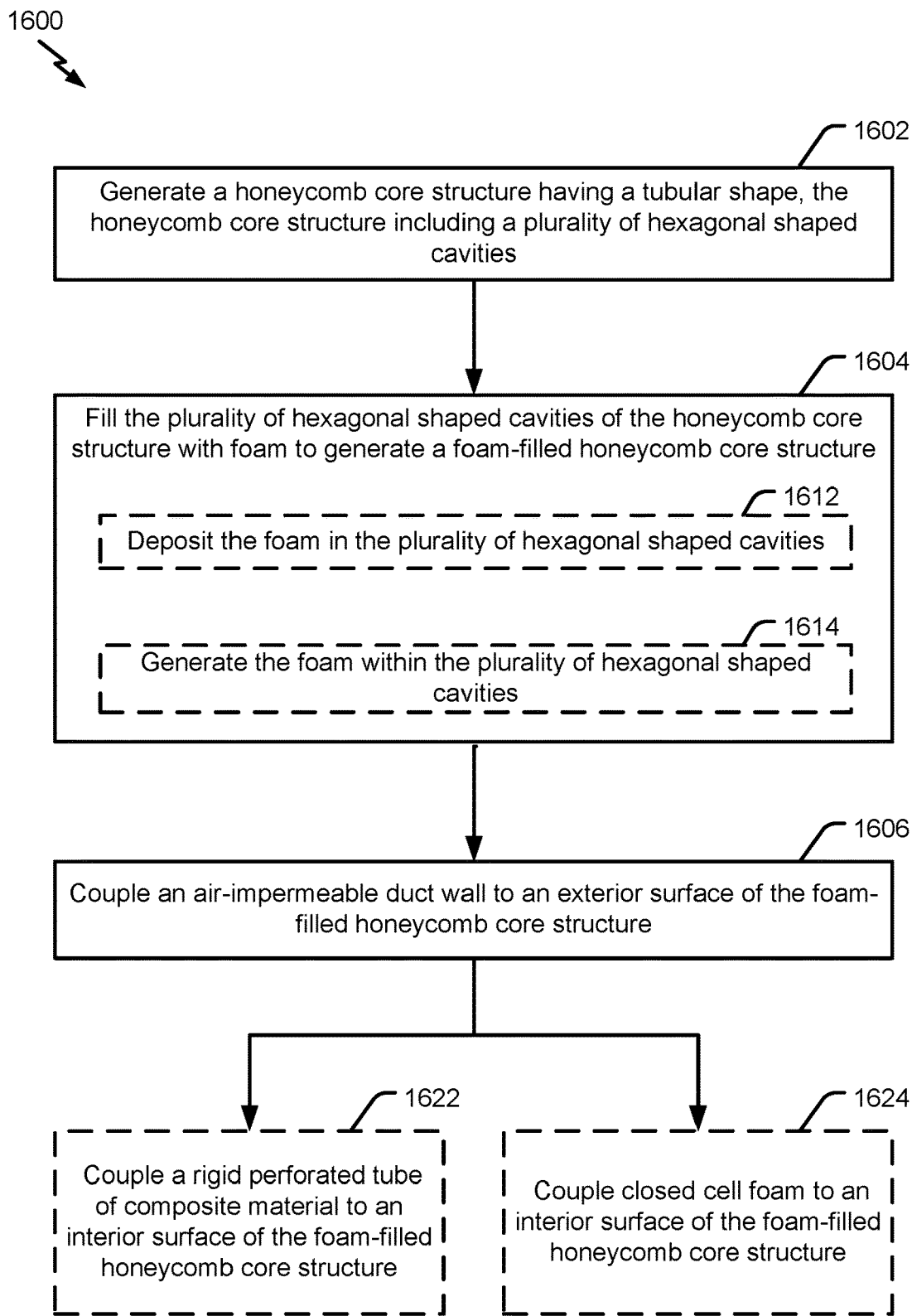
FIG. 16 is a flow chart of another example of a method of manufacturing a duct.

FIG. 16 illustrates a particular example of a method 1600 of manufacturing a duct, such as the ducts 102B of FIG. 1. The method 1600 includes, at 1602, generating a honeycomb core structure having a tubular shape, the honeycomb core structure including a plurality of hexagonal shaped cavities. For example, the honeycomb core structure may include or correspond to the core structure 172 of FIG. 1 and the plurality of hexagonal shaped cavities may include or correspond to the plurality of cavities 174. To illustrate, the core structure 172 is formed into a tubular shape and surfaces thereof define the plurality of cavities 174. As illustrative, non-limiting examples, composite materials may be cured to form the core structure 172 or metal may be machined to form the core structure 172.

The method 1600 also includes, at 1604, filling the plurality of hexagonal shaped cavities of the honeycomb core structure with foam to generate a foam-filled honeycomb core structure. For example, the foam may include or correspond to the foam 176, the closed cell foam 134, or the open cell foam 152 of FIG. 1. The foam-filled honeycomb core structure may include or correspond to the foam-filled honeycomb core structure 144 of FIG. 1.

In some implementations, filling 1604 the plurality of hexagonal shaped cavities of the honeycomb core structure with foam includes depositing 1612 the foam in the plurality of hexagonal shaped cavities. To illustrate, the foam 176 is inserted or deposited into the plurality of cavities 174. In other implementations, filling 1604 the plurality of hexagonal shaped cavities of the honeycomb core structure with foam includes generating 1614 the foam within the plurality of hexagonal shaped cavities. To illustrate, a coating is applied (e.g., sprayed) to the plurality of cavities 174 and heat is applied to the coating to generate or grow the foam 176 in the plurality of cavities 174.

The method 1600 further includes, at 1606, coupling an air-impermeable duct wall to an exterior surface of the foam-filled honeycomb core structure. For example, the air-impermeable duct wall may include or correspond to the air-impermeable duct wall 146, the thermoplastic film 162, or the rigid tube 166 of FIG. 1. To illustrate, the air-impermeable duct wall 146 is formed by wrapping the thermoplastic film 162 around the outside or exterior of the foam-filled honeycomb core structure 144. Alternatively, the air-impermeable duct wall 146 is formed by coupling the rigid tube 166 to the outside or exterior of the foam-filled honeycomb core structure 144.

In some implementations, the method 1600 further includes coupling 1622 closed a rigid perforated tube of composite material to an interior surface of the foam-filled honeycomb core structure. To illustrate, the rigid perforated tube of composite material is coupled to the interior surface of the foam-filled honeycomb core structure 144. In other implementations, the method 1600 further includes coupling 1624 closed cell foam to an interior surface of the foam-filled honeycomb core structure. To illustrate, the closed cell foam 134 is coupled to the interior surface of the foam-filled honeycomb core structure 144.

The method 1400 of FIG. 14, the method 1500 of FIG. 15, and/or the method 1600 of FIG. 16 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 1400 of FIG. 14 can be initiated or controlled by one or more processors, such as one or more processors included in a control system. In some implementations, a portion of the method 1400 of FIG. 14 may be combined with a second portion of one of the method 1500 of FIG. 15 or the method 1600 of FIG. 16. Additionally, one or more operations described with reference to FIGS. 14-16 may be optional and/or may be performed in a different order than shown or described. Two or more operations described with reference to FIGS. 14-16 may be performed at least partially concurrently.

Figure 17:
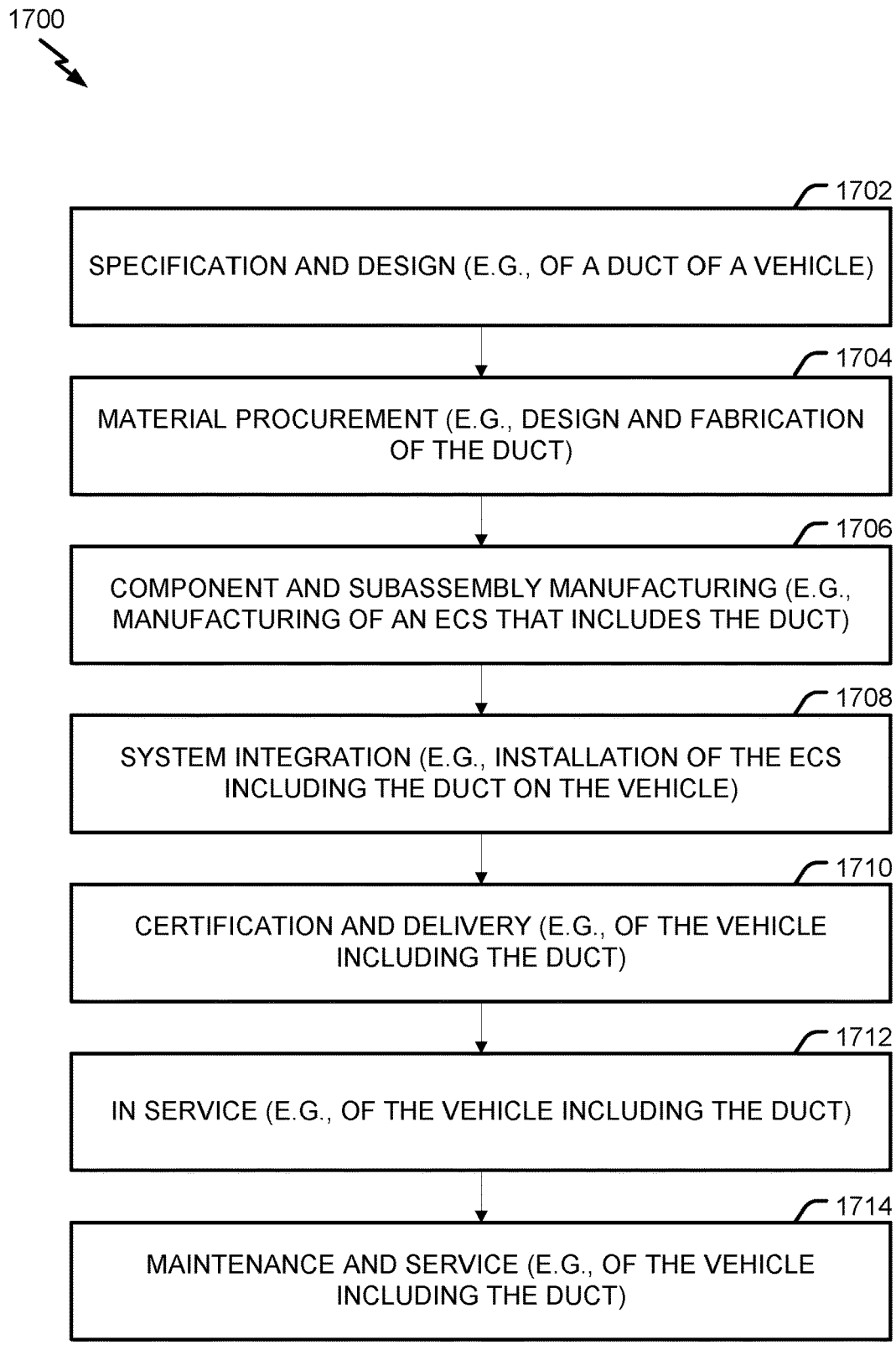
FIG. 17 is a flow chart of an example of a method of duct manufacturing and service.
Figure 18:
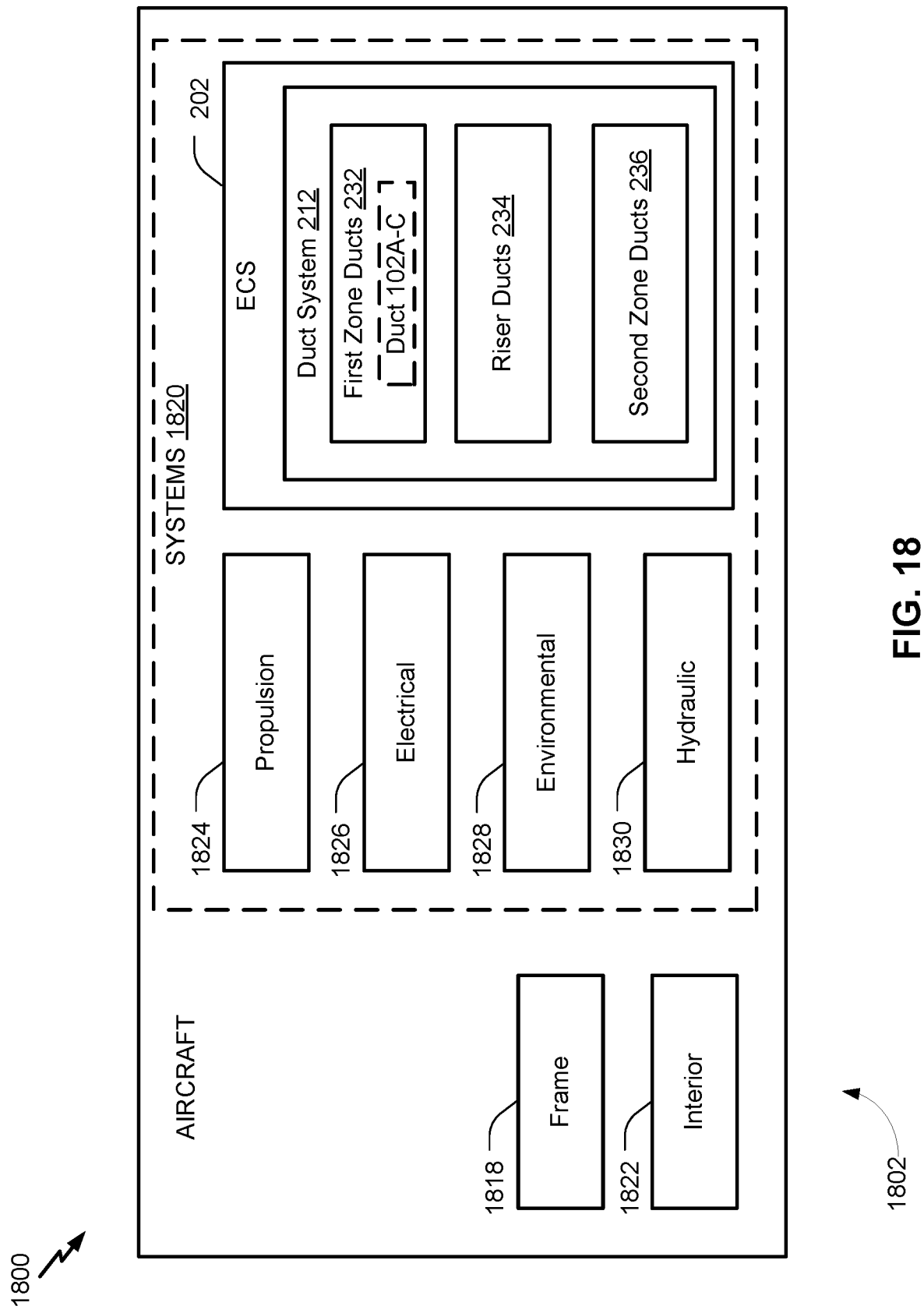
FIG. 18 is a block diagram that illustrates an example of a vehicle including a duct.

Referring to FIGS. 17 and 18, examples of the disclosure are described in the context of a vehicle manufacturing and service method 1700 as illustrated by the flow chart of FIG. 17 and a vehicle 1802 as illustrated by the block diagram 1800 of FIG. 18. A vehicle produced by the vehicle manufacturing and service method 1700 of FIG. 17, such as the vehicle 1802 of FIG. 18, may include an aircraft, an airship, a rocket, a satellite, a submarine, or another vehicle, as illustrative, non-limiting examples. The vehicle 1802 may be manned or unmanned (e.g., a drone or an unmanned aerial vehicle (UAV)).

Referring to FIG. 17, a flowchart of an illustrative example of a method of duct manufacturing and service is shown and designated 1700. During pre-production, the exemplary method 1700 includes, at 1702, specification and design of a vehicle, such as a vehicle 1802 described with reference to FIG. 18. During the specification and design of the vehicle 1802, the method 1700 may include specifying a design of a duct, such as the one or more of the ducts 102A-102C of FIG. 1. At 1704, the method 1700 includes material procurement. For example, the method 1700 may include procuring materials for one or more of the ducts 102A-102C of the vehicle 1802.

During production, the method 1700 includes, at 1706, component and subassembly manufacturing and, at 1708, system integration of the vehicle 1802. The method 1700 may include component and subassembly manufacturing (e.g., manufacturing one or more of the ducts 102A-102C of FIG. 1) of the vehicle 1802 and system integration (e.g., coupling one or more of the ducts 102A-102C of FIG. 1 to one or more components of the vehicle 1802, such as components of the ECS 202 of FIG. 2). At 1710, the method 1700 includes certification and delivery of the vehicle 1802 and, at 1712, placing the vehicle 1802 in service. Certification and delivery may include certifying one or more of the ducts 102A-102C of FIG. 1 by inspection or non-destructive testing. While in service by a customer, the vehicle 1802 may be scheduled for routine maintenance and service (which may also include modification, reconfiguration, refurbishment, and so on). At 1714, the method 1700 includes performing maintenance and service on the vehicle 1802. The method 1700 may include performing maintenance and service of the ECS 202 of FIG. 2, such as the duct system 212 or the air conditioning unit 214, or one or more of the ducts 102A-102C of FIG. 1. For example, maintenance and service of the duct system 212 may include replacing one or more ducts of the duct system 212 with one or more of the ducts 102A-102C. As a particular non-limiting illustration, performing maintenance and service includes removing a duct and noise attenuating muffler from the ECS 202 and installing one or more of the ducts 102A-102C in the ECS 202 to replace the duct and the noise attenuating muffler (e.g., a zone muffler).

Each of the processes of the method 1700 may be performed or carried out by a system integrator, a third party, and/or an operator (e.g., a customer). For the purposes of this description, a system integrator may include without limitation any number of vehicle manufacturers and major-system subcontractors; a third party may include without limitation any number of venders, subcontractors, and suppliers; and an operator may be an airline, leasing company, military entity, service organization, and so on.

Referring to FIG. 18, a block diagram 1800 of an illustrative implementation of the vehicle 1802 that includes a duct, such as one or more of the ducts 102A-102C of FIG. 1. To illustrate, the vehicle 1802 may include an aircraft, such as the aircraft 200 of FIG. 2, as an illustrative, non-limiting example. The vehicle 1802 may have been produced by at least a portion of the method 1700 of FIG. 17. As shown in FIG. 18, the vehicle 1802 (e.g., the aircraft 200 of FIG. 2) includes an airframe 1818, an interior 1822, and a plurality of systems 1820. The plurality of systems 1820 may include one or more of a propulsion system 1824, an electrical system 1826, an environmental system 1828, or a hydraulic system 1830. The plurality of systems 1820 further includes the ECS 202. The ECS 202 may be part of the environmental system 1828 or separate from the environmental system 1828. The ECS 202 includes the first zone ducts 232, the riser ducts 234, the second zone ducts 236, and one or more of the ducts 102A-102C. The ducts 102A-102C may be manufactured by one or more steps of the methods of FIGS. 14-16.

Apparatus and methods included herein may be employed during any one or more of the stages of the method 1700 of FIG. 17. For example, components or subassemblies corresponding to production process 1708 may be fabricated or manufactured in a manner similar to components or subassemblies produced while the vehicle 1802 is in service, at 1712 for example and without limitation. Also, one or more apparatus implementations, method implementations, or a combination thereof may be utilized during the production stages (e.g., stages 1702-1710 of the method 1700), for example, by substantially expediting assembly of or reducing the cost of the vehicle 1802. Similarly, one or more of apparatus implementations, method implementations, or a combination thereof, may be utilized while the vehicle 1802 is in service, at 1712 for example and without limitation, to maintenance and service, at 1714.

Figure 19:
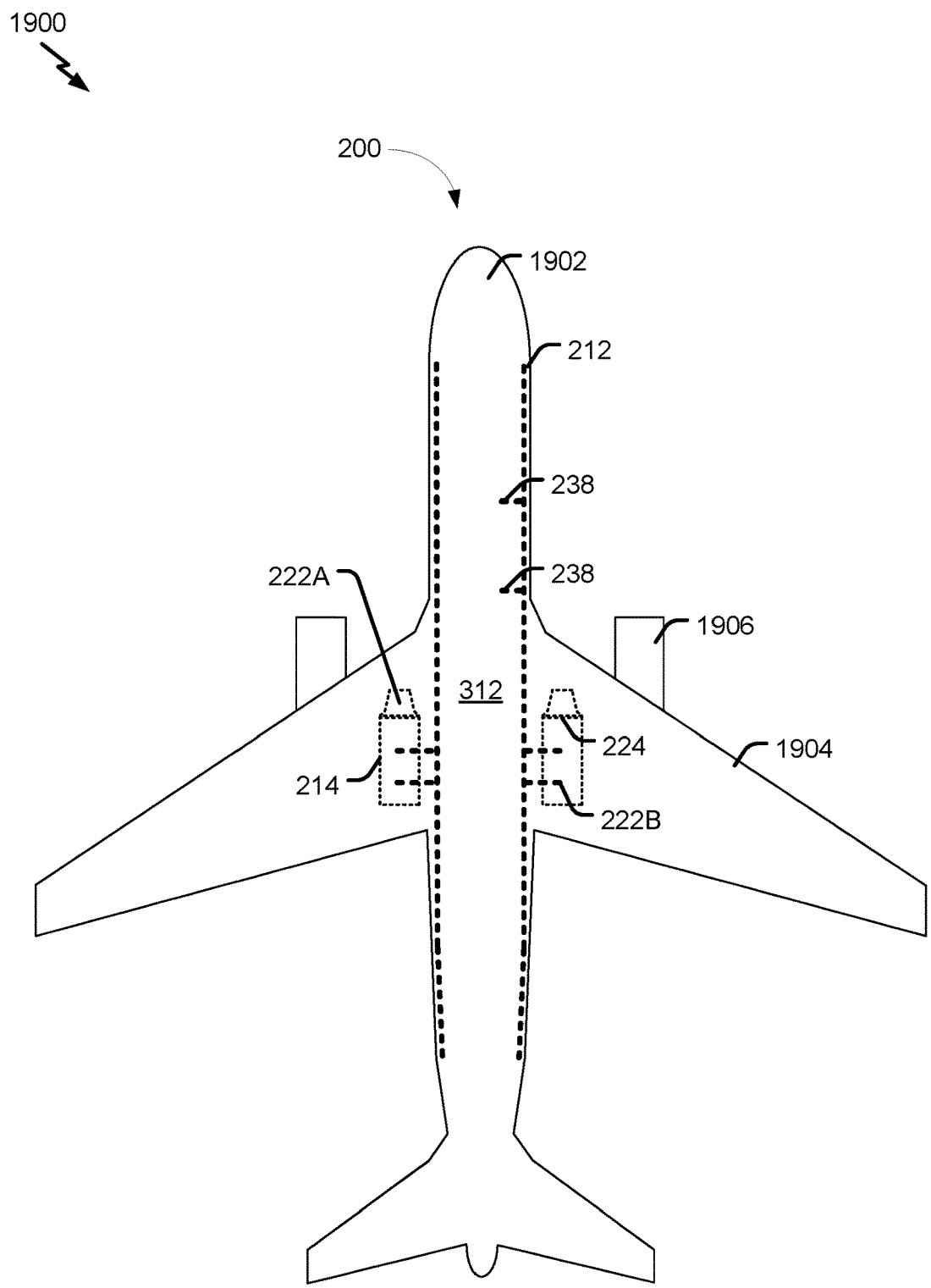
FIG. 19 is a diagram that illustrates a top view of an example of an aircraft including the environmental control system of FIG. 2.

FIG. 19 is a diagram 1900 that illustrates a top view of an example of the aircraft 200 including the ECS 202 of FIG. 2. With reference to FIG. 19, the aircraft 200 comprises a pair of wings 1904 faired into a fuselage 1902. Each wing 1904 carries an engine 1906. The fuselage 1902 comprises the cabin 312 for passengers and crew. In the present embodiment, the aircraft 200 includes two air conditioning units 214 to provide the treated air 352 (i.e., conditioned air) of FIG. 3 to the cabin 312 via the duct system 212.

In the implementation illustrated in FIG. 19, each air conditioning unit 214 has a corresponding duct system 212 that extends along a length of the cabin 312 fore and aft. The duct system 212 includes the first zone ducts 232, the riser ducts 234, and the second zone ducts 236 of FIG. 2. One or more of the first zone ducts 232, the riser ducts 234, or the second zone ducts 236 include one or more of the ducts 102A-102C. The first zone ducts 232, the riser ducts 234, and the second zone ducts 236 can be arranged as illustrated in FIG. 3. For example, the first zone ducts 232 receive the treated air 352 from a corresponding air conditioning unit 214 and provide the treated air 352 to the outlet ports 238, such as via the riser ducts 234 and/or the second zone ducts 236. Although two exemplary outlet ports 238 are illustrated in FIG. 19, the duct system 212 can include more the two outlet ports 238.

Each air conditioning unit 214 has or is coupled to at least one exhaust port 224 for outputting waste hot air from the air conditioning unit 214 overboard to atmosphere. In a particular implementation, each exhaust port 224 includes a corresponding ram air outlet (not shown) located on the underside of the corresponding wing 102.

In the implementation illustrated in FIG. 19, each air conditioning unit 214 has two intake ports 222 for receiving air to be treated and distributed to the cabin 312 via the duct system 212 and/or waste hot air to be exhausted. In the implementation illustrated in FIG. 19, each air conditioning unit 214 has an intake port 222A (e.g., a first intake port) to receive air from the atmosphere and has an intake port 222B (e.g., a second intake port) to receive air from the cabin 312.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A duct comprising:
    a rigid air-permeable tube of composite material;
    a layer of insulation coupled to an exterior surface of the rigid air-permeable tube, the layer of insulation comprising aramid felt; and
    a non-rigid insulation layer applied to an exterior surface of the layer of insulation, the non-rigid insulation layer forming an air-impermeable duct wall that seals the duct, the non-rigid insulation layer comprises a polyetherketoneketone (PEKK) film or a high mass fabric.

2. The duct of claim 1, wherein the composite material comprises a fabric material having a leno weave arrangement.

3. The duct of claim 1, wherein the layer of insulation comprises spiral wrapped melamine foam.

4. The duct of claim 3, wherein the composite material comprises an open weave composite material tube.

5. The duct of claim 1, further comprising adhesive tape coupled to the layer of insulation and to the non-rigid insulation layer.

6. The duct of claim 1, wherein an adhesive tape is configured to restrain the layer of insulation and the non-rigid insulation layer, and wherein the adhesive tape includes metallized polyether ether ketone (MPEEK).

7. The duct of claim 1, wherein the rigid air-permeable tube has a circular cross-section, an elliptical cross-section, a rectangular cross-section, a square cross-section, a triangular cross-section, or a hexagonal cross-section, and wherein the rigid air-permeable tube further includes an inlet, an outlet opposing the inlet, and an interior surface opposing the exterior surface.

8. The duct of claim 1, wherein the layer of insulation is configured to absorb sound and to thermally insulate the duct, wherein the non-rigid insulation layer is configured to thermally insulate the duct.

9. A vehicle including the duct of claim 1, the vehicle comprising:
    an environmental control system, the environmental control system including:
        first zone ducts;
        second zone ducts; and
        riser ducts coupled to the first zone ducts and the second zone ducts, wherein one of the first zone ducts, the second zone ducts, or the riser ducts comprises the duct of claim 1.

10. The vehicle of claim 9, wherein the first zone ducts do not include a noise attenuating muffler.

11. A method of manufacturing a duct, the method comprising:
    applying insulation to an exterior surface of a rigid air-permeable tube of composite material to form a layer of insulation on the exterior surface of the rigid air-permeable tube; and
    applying non-rigid insulation to an exterior surface of the layer of insulation to form a non-rigid insulation layer in contact with the layer of insulation, the non-rigid insulation layer forming an air-impermeable duct wall that seals the duct, the non-rigid insulation layer comprises a polyether ether ketone (PEEK) film or a high mass fabric.

12. The method of claim 11, wherein forming the layer of insulation creates a first seam along the layer of insulation, and wherein forming the non-rigid insulation layer creates a second seam along the non-rigid insulation layer, and wherein the method further comprises applying an adhesive over the first seam and the second seam.

13. The method of claim 11, further comprising applying adhesive tape to the layer of insulation, the non-rigid insulation layer, or both, to secure the layer of insulation to the rigid air-permeable tube, to secure the non-rigid insulation layer to the layer of insulation, or both.

14. An environmental control system comprising:
    an air conditioning unit;
    an intake port;
    an exhaust port; and
    a plurality of ducts, wherein the plurality of ducts is configured to direct fluid between the intake port and the air conditioning unit, wherein the plurality of ducts is further configured to direct the fluid from the air conditioning unit and the exhaust port, and wherein a duct of the plurality of the ducts comprises:
        a rigid air-permeable tube of composite material;
        a layer of insulation coupled to an exterior surface of the rigid air-permeable tube, the layer of insulation comprising aramid felt or a layer of open cell foam; and
        a non-rigid insulation layer applied to an exterior surface of the layer of insulation, the non-rigid insulation layer forming an air-impermeable duct wall that seals the duct, the non-rigid insulation layer comprises a high mass fabric.

15. The environmental control system of claim 14, wherein the duct is a zone duct.

16. The environmental control system of claim 14, wherein the plurality of duct is configured to direct fluid to a plurality of outlet ports distinct from the exhaust port.

17. The environmental control system of claim 14, wherein the duct is a riser duct.

18. The environmental control system of claim 14, wherein the plurality of ducts is configured to direct fluid to a plurality of outlet ports distinct from the exhaust port.

19. The environmental control system of claim 14, wherein the composite material comprises a fabric material having a leno weave arrangement.

20. The environmental control system of claim 14, wherein the layer of insulation comprises spiral wrapped melamine foam.

21. The environmental control system of claim 14, wherein the composite material comprises an open weave composite material tube.

22. The environmental control system of claim 14, further comprising adhesive tape coupled to the layer of insulation and to the non-rigid insulation layer.

23. The environmental control system of claim 14, wherein the rigid air-permeable tube has a circular cross-section, an elliptical cross-section, a rectangular cross-section, a square cross-section, a triangular cross-section, or a hexagonal cross-section, and wherein the rigid air-permeable tube further includes an inlet, an outlet opposing the inlet, and an interior surface opposing the exterior surface.

\* \* \* \* \*

UNITED STATES PATENT AND TRADEMARK OFFICE
CERTIFICATE OF CORRECTION

PATENT NO. : 11,739,973 B2
APPLICATION NO. : 16/105864
DATED : August 29, 2023
INVENTOR(S) : Bryce A. Vandyke et al.

It is certified that error appears in the above-identified patent and that said Letters Patent is hereby corrected as shown below:

In the Claims

At Column 19, Line 2, "wherein the plurality of duct" should be --wherein the plurality of ducts--.

Signed and Sealed this
Nineteenth Day of March, 2024

Katherine Kelly Vidal
*Director of the United States Patent and Trademark Office*